US008632406B2

(12) United States Patent
Hedrick et al.

(10) Patent No.: US 8,632,406 B2

(45) **Date of Patent: *Jan. 21, 2014**

(54) PLAYER TRACKING COMMUNICATION MECHANISMS IN A GAMING MACHINE

(75) Inventors: Joseph R. Hedrick, Reno, NV (US); Binh T. Nguyen, Reno, NV (US); Mike Kinsley, Reno, NV (US)

(73) Assignee: IGT, Las Vegas, NV (US)

( * ) Notice: Subject to any disclaimer, the term of this patent is extended or adjusted under 35 U.S.C. 154(b) by 680 days.

This patent is subject to a terminal disclaimer.

(21) Appl. No.: 11/829,718

(22) Filed: Jul. 27, 2007

(65) Prior Publication Data

US 2008/0051195 A1 Feb. 28, 2008

Related U.S. Application Data

(63) Continuation of application No. 11/471,352, filed on Jun. 19, 2006, which is a continuation of application No. 10/246,373, filed on Sep. 16, 2002, now Pat. No. 7,112,138, which is a continuation-in-part of application No. 09/921,489, filed on Aug. 3, 2001, now Pat. No. 6,908,387.

(51) Int. Cl.
*A63F 13/00* (2006.01)

(52) U.S. Cl.
USPC .............................................. 463/42; 463/29

(58) Field of Classification Search
USPC ........................................ 469/29; 463/42, 29
See application file for complete search history.

(56) References Cited

U.S. PATENT DOCUMENTS

| | | | |
|---|---|---|---|
| 4,669,730 | A | 6/1987 | Small |
| 4,856,787 | A | 8/1989 | Itkis |
| 5,129,652 | A | 7/1992 | Wilkinson |
| 5,206,495 | A | 4/1993 | Kreft |
| 5,318,298 | A | 6/1994 | Kelly et al. |
| 5,326,104 | A | 7/1994 | Pease et al. |
| 5,373,440 | A | 12/1994 | Cohen et al. |
| 5,429,361 | A | 7/1995 | Raven et al. |
| 5,575,717 | A | 11/1996 | Houriet et al. |

(Continued)

FOREIGN PATENT DOCUMENTS

| | | |
|---|---|---|
| AU | 199650576 | 4/1997 |
| CA | 2442442 | 10/1995 |

(Continued)

OTHER PUBLICATIONS

Office Action dated Aug. 11, 2008 from U.S. Appl. No. 10/661,404, 9 pgs.

(Continued)

*Primary Examiner* — Arthur O. Hall
*Assistant Examiner* — Jeffrey Wong
(74) *Attorney, Agent, or Firm* — Neal, Gerber & Eisenberg LLP

(57) ABSTRACT

A disclosed a player tracking unit provides a multimedia interface with a display and an interface to one or more sound projection devices and a multimedia board for processing digitally formatted program files for output on the multimedia interface. The player tracking unit may provide menus of audio and video programs, such as a menu for a musical jukebox or a menu for a video-on-demand service. Using a "TV-like" interface, a user may be able to select a program to output on the multimedia interface and control playback features of the program.

20 Claims, 14 Drawing Sheets

(56) References Cited

U.S. PATENT DOCUMENTS

| | | | |
|---|---|---|---|
| 5,643,086 A | 7/1997 | Alcorn et al. | |
| 5,655,961 A | 8/1997 | Acres et al. | |
| 5,702,304 A | 12/1997 | Acres et al. | |
| 5,722,891 A | 3/1998 | Inoue | |
| 5,735,742 A | 4/1998 | French | |
| 5,741,183 A | 4/1998 | Acres et al. | |
| 5,743,798 A | 4/1998 | Adams et al. | |
| 5,752,882 A | 5/1998 | Acres et al. | |
| 5,761,647 A | 6/1998 | Boushy | |
| 5,770,533 A | 6/1998 | Franchi | |
| 5,779,549 A | 7/1998 | Walker et al. | |
| 5,809,482 A | 9/1998 | Strisower | |
| 5,820,459 A | 10/1998 | Acres et al. | |
| 5,833,540 A | 11/1998 | Miodunski et al. | |
| 5,836,817 A | 11/1998 | Acres et al. | |
| 5,838,384 A | 11/1998 | Schindler et al. | |
| 5,851,149 A | 12/1998 | Xidos et al. | |
| 5,876,284 A | 3/1999 | Acres et al. | |
| 5,916,024 A | 6/1999 | Von Kohorn | |
| 5,951,397 A | 9/1999 | Dickinson | |
| 5,958,006 A | 9/1999 | Eggleston et al. | |
| 6,003,013 A | 12/1999 | Boushy et al. | |
| 6,012,832 A | 1/2000 | Saunders et al. | |
| 6,048,269 A | 4/2000 | Burns et al. | |
| 6,048,271 A | 4/2000 | Barcelou | |
| 6,078,789 A | 6/2000 | Bodenmann et al. | |
| 6,089,975 A | 7/2000 | Dunn | |
| 6,104,815 A | 8/2000 | Alcorn et al. | |
| 6,106,396 A | 8/2000 | Alcorn et al. | |
| 6,110,041 A | 8/2000 | Walker et al. | |
| 6,113,495 A | 9/2000 | Walker et al. | |
| 6,135,884 A * | 10/2000 | Hedrick et al. | 463/20 |
| 6,135,887 A | 10/2000 | Pease et al. | |
| 6,142,876 A | 11/2000 | Cumbers | |
| 6,149,522 A | 11/2000 | Alcorn et al. | |
| 6,161,762 A | 12/2000 | Bashan et al. | |
| 6,162,122 A | 12/2000 | Acres et al. | |
| 6,164,652 A | 12/2000 | Lauretta et al. | |
| 6,168,084 B1 | 1/2001 | Mish | |
| 6,168,521 B1 | 1/2001 | Luciano et al. | |
| 6,174,234 B1 | 1/2001 | Seibert, Jr. et al. | |
| 6,182,217 B1 | 1/2001 | Sedlak | |
| 6,183,362 B1 | 2/2001 | Boushy | |
| 6,186,893 B1 | 2/2001 | Walker et al. | |
| 6,193,163 B1 | 2/2001 | Fehrman et al. | |
| 6,195,712 B1 | 2/2001 | Pawlowski et al. | |
| 6,202,932 B1 | 3/2001 | Rapeli | |
| 6,210,279 B1 | 4/2001 | Dickinson | |
| 6,227,970 B1 | 5/2001 | Shimizu et al. | |
| 6,230,029 B1 | 5/2001 | Hahn et al. | |
| 6,238,288 B1 | 5/2001 | Walker et al. | |
| 6,244,958 B1 | 6/2001 | Acres | |
| 6,254,483 B1 | 7/2001 | Acres | |
| 6,257,981 B1 | 7/2001 | Acres et al. | |
| 6,264,560 B1 | 7/2001 | Goldberg et al. | |
| 6,308,227 B1 | 10/2001 | Kumar et al. | |
| 6,315,660 B1 | 11/2001 | DeMar et al. | |
| 6,319,125 B1 | 11/2001 | Acres | |
| 6,325,294 B2 | 12/2001 | Tuttle et al. | |
| 6,343,988 B1 | 2/2002 | Walker et al. | |
| 6,371,852 B1 | 4/2002 | Acres | |
| 6,379,246 B1 | 4/2002 | Dabrowski | |
| 6,383,076 B1 | 5/2002 | Tiedeken | |
| 6,397,387 B1 | 5/2002 | Rosin et al. | |
| 6,398,649 B1 | 6/2002 | Sugaya | |
| 6,409,595 B1 | 6/2002 | Uihlein et al. | |
| 6,487,180 B1 | 11/2002 | Borgstahl et al. | |
| 6,582,310 B1 * | 6/2003 | Walker et al. | 463/42 |
| 6,587,835 B1 | 7/2003 | Treyz et al. | |
| 6,629,591 B1 | 10/2003 | Griswold et al. | |
| 6,638,170 B1 | 10/2003 | Crumby | |
| 6,769,982 B1 | 8/2004 | Brosnan | |
| 6,782,245 B1 | 8/2004 | Lazzarotto et al. | |
| 6,814,665 B2 | 11/2004 | Seelig et al. | |
| 6,857,021 B1 | 2/2005 | Sidhu et al. | |
| 6,866,586 B2 | 3/2005 | Oberberger et al. | |
| 6,908,324 B1 | 6/2005 | Morley et al. | |
| 6,908,387 B2 | 6/2005 | Hedrick et al. | |
| 6,922,567 B1 | 7/2005 | Rydbeck | |
| 6,970,602 B1 | 11/2005 | Smith et al. | |
| 6,987,947 B2 | 1/2006 | Richenstein et al. | |
| 7,032,115 B2 | 4/2006 | Kashani | |
| 7,112,138 B2 | 9/2006 | Hedrick et al. | |
| 7,203,665 B2 | 4/2007 | Donner | |
| 7,231,380 B1 | 6/2007 | Pienkos | |
| 7,280,975 B1 | 10/2007 | Donner | |
| 7,927,212 B2 | 4/2011 | Hedrick et al. | |
| 8,210,927 B2 | 7/2012 | Hedrick et al. | |
| 2001/0010689 A1 | 8/2001 | Awater et al. | |
| 2001/0044339 A1 | 11/2001 | Cordero et al. | |
| 2001/0048685 A1 | 12/2001 | Park et al. | |
| 2001/0049775 A1 | 12/2001 | Rechberger et al. | |
| 2002/0042296 A1 | 4/2002 | Walker et al. | |
| 2002/0047044 A1 | 4/2002 | Orus et al. | |
| 2002/0052239 A1 | 5/2002 | Finn | |
| 2002/0080967 A1 | 6/2002 | Abdo et al. | |
| 2002/0107066 A1 | 8/2002 | Seelig et al. | |
| 2002/0116615 A1 | 8/2002 | Nguyen et al. | |
| 2002/0149470 A1 | 10/2002 | Mynatt et al. | |
| 2002/0167406 A1 | 11/2002 | Garber et al. | |
| 2002/0174336 A1 | 11/2002 | Sakakibara et al. | |
| 2002/0174364 A1 | 11/2002 | Nordman et al. | |
| 2002/0187828 A1 | 12/2002 | Benbrahim | |
| 2002/0194619 A1 * | 12/2002 | Chang et al. | 725/134 |
| 2003/0003997 A1 | 1/2003 | Vuong et al. | |
| 2003/0017865 A1 | 1/2003 | Beaulieu et al. | |
| 2003/0017871 A1 | 1/2003 | Urie et al. | |
| 2003/0027631 A1 | 2/2003 | Hedrick et al. | |
| 2003/0040960 A1 | 2/2003 | Eckmann | |
| 2003/0043771 A1 | 3/2003 | Mizutani et al. | |
| 2003/0054881 A1 | 3/2003 | Hedrick et al. | |
| 2003/0064805 A1 | 4/2003 | Wells | |
| 2003/0067389 A1 | 4/2003 | Look | |
| 2003/0095525 A1 | 5/2003 | Lavin | |
| 2003/0119575 A1 | 6/2003 | Centuori et al. | |
| 2003/0125973 A1 | 7/2003 | Mathews et al. | |
| 2003/0176218 A1 | 9/2003 | LeMay et al. | |
| 2004/0025594 A1 | 2/2004 | Broden et al. | |
| 2004/0082385 A1 | 4/2004 | Silva et al. | |
| 2004/0137978 A1 | 7/2004 | Cole et al. | |
| 2005/0003890 A1 | 1/2005 | Hedrick | |
| 2005/0069101 A1 | 3/2005 | Bear | |
| 2005/0113172 A1 | 5/2005 | Gong | |
| 2005/0116020 A1 | 6/2005 | Smolucha et al. | |
| 2005/0136949 A1 | 6/2005 | Barnes | |
| 2005/0154823 A1 | 7/2005 | Bruner | |
| 2005/0187012 A1 | 8/2005 | Walker et al. | |
| 2005/0239546 A1 | 10/2005 | Hedrick et al. | |
| 2006/0126861 A1 | 6/2006 | Saliterman | |
| 2006/0173781 A1 | 8/2006 | Donner | |
| 2006/0188118 A1 | 8/2006 | Berger et al. | |
| 2006/0252529 A1 | 11/2006 | Hedrick et al. | |
| 2007/0087810 A1 | 4/2007 | Walker et al. | |
| 2007/0242834 A1 | 10/2007 | Coutinho et al. | |
| 2007/0287516 A1 | 12/2007 | Cheung et al. | |
| 2008/0254886 A1 | 10/2008 | Kelly | |
| 2012/0088573 A1 | 4/2012 | Hedrick et al. | |

FOREIGN PATENT DOCUMENTS

| | | |
|---|---|---|
| CA | 2151990 | 12/1995 |
| EP | 0360613 | 3/1990 |
| EP | 0769769 | 4/1997 |
| EP | 1096438 | 2/2001 |
| ES | 9812648 | 3/1998 |
| JP | 2002157396 | 5/2002 |
| WO | WO 96/09100 | 3/1996 |
| WO | WO 96/12262 | 4/1996 |
| WO | 0078419 | 12/2000 |
| WO | WO 01/01286 A2 | 1/2001 |
| WO | 0217251 | 2/2002 |
| WO | 0224288 | 3/2002 |
| WO | WO 03/015042 | 2/2003 |
| WO | 0425594 | 3/2004 |

(56) References Cited

FOREIGN PATENT DOCUMENTS

| | | |
|---|---|---|
| WO | 2004025594 | 3/2004 |
| WO | WO 2004/025595 | 3/2004 |
| WO | WO 2006/015233 | 2/2006 |
| WO | WO 2006/105182 | 10/2006 |

OTHER PUBLICATIONS

Office Action dated Aug. 12, 2008 from U.S. Appl. No. 10/903,024.
Office Action dated Sep. 11, 2008 from U.S. Appl. No. 10/904,943.
Office Action dated Dec. 24, 2008 from U.S. Appl. No. 10/903,024.
Office Action dated Dec. 5, 2008 from Australian Patent Application No. 2003273319.
Office Action dated Jan. 8, 2009 from U.S. Appl. No. 11/471,352.
Examination Report dated Feb. 2, 2009 from related Australian Application No. 2003267167.
Decision to Refuse dated Feb. 23, 2009 from related European Application No. 03755819.4.
Office Action dated Mar. 27, 2009 from U.S. Appl. No. 11/094,943.
Office Action dated Feb. 22, 2010 from U.S. Appl. No. 11/094,943.
Second Office Action dated Feb. 5, 2010 from Chinese Patent Application No. 2006800110753.
Examination Report dated Apr. 29, 2009 from European Patent Application No. 06739913.9.
Office Action dated May 27, 2009 from U.S. Appl. No. 10/661,404.
Final Office Action dated Jun. 4, 2009 from U.S. Appl. No. 11/471,352.
Office Action dated Mar. 13, 2009 from Chinese Patent Application No. 2006800110753.
Statement of Grounds and Particulars dated May 15, 1009 from Australian Patent Application No. 2002329644.
Statement of Grounds dated Jun. 30, 1009 from European Patent Application No. 03755819.4.
Final Office Action dated Oct. 2, 2009 from U.S. Appl. No. 10/903,024.
Final Office Action dated Oct. 2, 2009 from U.S. Appl. No. 11/094,943.
Final Office Action dated Dec. 21, 2009 from U.S. Appl. No. 10/661,404.
Final Office Action dated Jan. 8, 2010 from U.S. Appl. No. 11/471,352.
Office Action dated Dec. 23, 2009 from Australian Patent Application No. 2003273319.
Erasala et al., "Bluetooth technology: a strategic analysis of its role in global 3G wireless communication era", Computer Standards and Interfaces, Elsevier Sequola. Lusanne, CH, vol. 24, No. 3, Jul. 2002, pp. 193-206, XP004360409, ISSN: 0920-5489 the whole document.
Oberberger et al., "Cashless Transaction Clearinghouse," U.S. Appl. No. 09/993,163, filed Nov. 16, 2001.
U.S. Appl. No. 10/040,239, filed Jan. 1, 2002.
U.S. Appl. No. 10/116,424, filed Apr. 3, 2002.
U.S. Appl. No. 10/246,373, filed Sep. 16, 2002.
U.S. Appl. No. 10/291,926, filed Nov. 7, 2002.
U.S. Appl. No. 10/460,822, filed Jun. 11, 2003.
U.S. Appl. No. 10/661,404, filed Sep. 11, 2003.
U.S. Appl. No. 09/921,489, filed Aug. 3, 2001.
PCT Search Report and Written Opinion, dated Nov. 30, 2005 from PCT Application No. PCT/US2005/027032 (8 pages).
Office Action dated Oct. 3, 2003 from U.S. Appl. No. 09/921,489.
Final Office Action dated Apr. 7, 2004 from U.S. Appl. No. 09/921,489.
Notice of Allowance dated Feb. 10, 2005 from U.S. Appl. No. 09/921,489.
Office Action dated Dec. 13, 2005 from U.S. Appl. No. 10/246,373.
Notice of Allowance dated Jun. 2, 2006 from U.S. Appl. No. 10/246,373.
Office Action dated Sep. 28, 2007 from U.S. Appl. No. 10/661,404.
"Leading-edge smart card technology meets smartest watch technology", Business News from Phillips Semiconductors, E/BN-1148/60, Aug. 29, 2000.
Office Action dated May 12, 2003 from U.S. Appl. No. 10/084,820.
Office Action dated Mar. 11, 2005 from U.S. Appl. No. 10/183,892.
U.S. Appl. No. 09/491,899. filed Jan. 27, 2000.
Examiner's Communication pursuant to Article 96(2) EPC, dated Dec. 27, 2006 from European Patent Application No. 02765884.8 (17 pages).
International Search Report dated Oct. 9, 2006 from International Patent Application No. PCT/US2006/011443.
Written Opinion of International Searching Authority, dated Oct. 12, 2006 from International Patent Application No. PCT/US2006/011443.
Office Action dated Jul. 11, 2006 from European Patent Application No. 03755819.4 (4 pages).
Marshall Fey, Slot Machines, A Pictorial History of the First 100 years, Liberty Belle Books, pp. 100-117, 1983.
Charny et al., "Magnets attracting wireless attention", CNET News.com, http://www.news.com, Sep. 19, 2003, pp. 1-2.
Advisory Office Action dated Sep. 10, 2007 from Russian Patent Application No. 2005106989/09.
Office Action dated Jan. 24, 2008 from U.S. Appl. No. 10/903,024.
Office Action dated Apr. 21, 2008 from European Patent Application No. 03755819.4.
Office Action dated Feb. 26, 2008 from U.S. Appl. No. 11/094,943.
Office Action dated Apr. 29, 2008 from U.S. Appl. No. 11/471,352.
Search Report dated Jan. 29, 2008 from European Patent Application No. 07020533.1.
Summons to attend Oral Proceedings dated Aug. 13, 2007 from European Patent Application No. 02765884.8.
Office Action dated Jul. 25, 2007 from Australian Patent Application No. 2002329644.
Advisory Office Action dated May 13, 2008 from Russian Patent Application No. 2005106989/09.
U.S. Appl. No. 13/329,110, filed Dec. 16, 2011, Hedrick et al.
U.S. Office Action dated Aug. 3, 2010 issued in U.S. Appl. No. 11/471,352.
U.S. Final Office Action dated Jan. 21, 2011 issued in U.S. Appl. No. 11/471,352.
U.S. Office Action dated Sep. 9, 2010 issued in U.S. Appl. No. 10/661,404.
U.S. Final Office Action dated Apr. 14, 2011 issued in U.S. Appl. No. 10/661,404.
U.S. Notice of Allowance dated Oct. 29, 2010 issued in U.S. Appl. No. 10/903,024.
U.S. 2nd Notice of Allowance dated Dec. 30, 2010 issued in U.S. Appl. No. 10/903,024.
U.S. Final Office Action dated Aug. 5, 2010 issued in U.S. Appl. No. 11/094,943.
U.S. Notice of Allowance dated Nov. 7, 2011 issued in U.S. Appl. No. 11/094,943.
U.S. Allowed Claims dated Nov. 7, 2011 for U.S. Appl. No. 11/094,943.
PCT International Preliminary Examination Report dated Jun. 5, 2003 issued in PCT/US02/23778.
CA Office Action dated Jul. 12, 2010 issued in CA 2,456,128.
PCT International Search Report dated Jan. 23, 2004 issued in PCT/US03/028693.
CA Office Action dated Feb. 1, 2011 issued in Canadian Application No. 2,498,814.
PCT International Search Report dated Feb. 24, 2004 issued in PCT/US2003/028694.
PCT International Preliminary Report on Patentability and Written Opinion dated Jan. 30, 2007 issued in PCT Application No. PCT/US2005/027032.
AU First Examiner's Report dated Apr. 20, 2010 issued in Australian Patent Application No. 2005267865.
AU Examiner's First Report dated Sep. 20, 2010 issued in Australian Patent Application No. 2006230257.
AU Examiner's Report No. 2 dated Jul. 28, 2011 issued in Australian Patent Application No. 2006230257.
CN Third Office Action dated Dec. 7, 2011 issued in Chinese Patent Application No. 2006800110753.
U.S. Notice of Allowance dated Feb. 27, 2012 issued in U.S. Appl. No. 11/471,352.

(56) References Cited

OTHER PUBLICATIONS

U.S. Notice of Allowance dated Feb. 29, 2012 issued in U.S. Appl. No. 11/094,943.
U.S. Third-Party Submission dated Jun. 11, 2012 submitted in U.S. Appl. No. 13/329,110.
CA Office Action dated Feb. 3, 2012 issued in Application No. 2,498,128.
CN Fourth Office Action dated May 31, 2012 issued in Application No. 2006800110753.
CN Fifth Office Action dated Aug. 31, 2012 issued in Application No. 2006800110753.
Office Action for Canadian Patent Application No. 2,498,814 dated Jan. 15, 2013 (7 pages).

* cited by examiner

PRIOR ART

PLAYER TRACKING COMMUNICATION MECHANISMS IN A GAMING MACHINE

CROSS-REFERENCE TO RELATED APPLICATIONS

This application is a continuation of U.S. patent application Ser. No. 11/471,352, entitled "PLAYER TRACKING COMMUNICATION MECHANISMS IN A GAMING MACHINE," filed Jun. 19, 2006, which is a continuation of U.S. patent application Ser. No. 10/246,373, entitled "PLAYER TRACKING COMMUNICATION MECHANISMS IN A GAMING MACHINE," filed Sep. 16, 2002, now U.S. Pat. No. 7,112,138, which is a continuation-in-part of U.S. patent application Ser. No. 09/921,489, now U.S. Pat. No. 6,908,387, entitled "PLAYER TRACKING COMMUNICATION MECHANISMS IN A GAMING MACHINE," filed Aug. 3, 2001, each of which is incorporated herein by reference in its entirety for all purposes.

BACKGROUND OF THE INVENTION

This invention relates to game playing methods for gaming machines such as video slot machines and video poker machines. More particularly, the present invention relates to methods and apparatus for providing player tracking services on a gaming machine.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server. Player tracking units are usually manufactured as an after-market device separate from the gaming machine. Many different companies manufacture player tracking units as part of player tracking/accounting systems. These player tracking/accounting systems are used in most casinos. Most casinos utilize only one type of player tracking system (i.e. from one manufacturer) while the type of player tracking system varies from casino to casino.

An example of a hardware and/or software implementation of a player tracking system with respect to a number of gaming machines is described as follows. FIG. 1 is a block diagram of a number of gaming machines with player tracking units connected to servers providing player tracking services. In casino 150, gaming machines 100, 101, 102 and 103 are connected, via the data collection unit (DCU) 106 to the player tracking/accounting server 120. The DCU 106, which may be connected to up to 32 player tracking units as part of a local network in a particular example, consolidates the information gathered from player tracking units in gaming machines 100, 101, 102 and 103 and forwards the information to the player tracking account server 120. The player tracking account server is designed 1) to store player tracking account information, such as information regarding a player's previous game play, and 2) to calculate player tracking points based on a player's game play that may be used as basis for providing rewards to the player.

In gaming machine 100 of casino 150, a player tracking unit 107 and slot machine interface board (SMIB) 105 are mounted within a main cabinet 8 of the gaming machine. A top box 6 is mounted on top of the main cabinet 8 of the gaming machine. In many types of gaming machines, the player tracking unit is mounted within the top box 6. Usually, player tracking units, such as 107, and SMIBs, such as 105, are manufactured as separate units before installation into a gaming machine, such as 100.

The player tracking unit 107 includes three player tracking devices, a card reader 24, a key pad 22, and a display 16, all mounted within the unit. The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush or at a slight angle upward with a horizontal in a flat top gaming machine.

The player tracking unit 107 communicates with the player tracking server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking server 120 to calculate player tracking points for the player. The player tracking unit 107 is usually connected to the master gaming controller 104 via a serial connection using a wire serial connector and communicates with the master gaming controller 104 using a serial communication protocol. The serial connection between the SMIB 105 and the master gaming controller 104 may be through the main communication board 110, through another intermediate device or through a direct connection to the master gaming controller 104. In general, communication between the various gaming devices is provided using wire connectors with proprietary communication protocols. As an example of a proprietary serial communication protocol, the master gaming controller 104 may employ a subset of the Slot Accounting System (SAS protocol) developed by International Game Technology of Reno, Nev. to communicate with the player tracking unit 107.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 107 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

As suggested above, a player's incentive for using the player tracking services is awards provided by the gaming machine operator (e.g., the casino). Some incentives of a casino for providing player tracking services is to generate "brand" loyalty, gather valuable information that may be used for marketing and provide better customer services. Unfortunately, when player tracking identification information is not provided to the player tracking server 120 via the player tracking unit 107, player tracking points are not accrued for a game player participating in a game play session on gaming machine 100. For example, when a player tracking card is not inserted into the card reader 24, the player tracking card has been inserted incorrectly or the card reader is malfunctioning, or the game player does not have a player tracking card, a game player may not obtain player tracking points while participating in game play on gaming machine 100. This happens more frequently than one might imagine and may be discouraging to the player.

Player tracking cards and player tracking programs are becoming more and more popular. They have become a de facto marketing method of doing business at casinos. The programs allow a casino to identify and reward customers based upon their previous game play history. In particular, a goal of the casinos is to identify and then to provide a higher level of service to certain groups of players identified as especially valuable to the casinos. For instance, players that visit the casino, on average, once a week may be deemed as "special" customers and the casino may desire to cultivate a "special" relationship with these customers. As indicated, a disadvantage of current player tracking programs using player tracking cards is that a game player may simply forget to bring her card, forget to insert it into the gaming machine, insert the card incorrectly into the card reader or not may not have a card. In each of these cases, the player will fail to earn player tracking points and the player is deprived of awards that would otherwise be provided. Further, the casino is deprived of valuable marketing information and is unable to provide loyalty incentives. In addition, the casino is unable to cultivate a special relationship with the player because their playing attributes remain unknown. Thus, in view of the above, it would be desirable to provide apparatus and methods for player tracking programs that allow both casinos and players to avoid and correct errors resulting from incorrect use of a player tracking system and that allow a casino to better serve "special" players.

SUMMARY OF THE INVENTION

This invention addresses the needs indicated above by providing a player tracking unit with a multimedia interface. The multimedia interface may include a display and an interface to one or more sound projection devices and a multimedia board for processing digitally formatted program files for output on the multimedia interface. The player tracking unit may provide menus of audio and video programs, such as a menu for a musical jukebox or a menu for a video-on-demand service. Using a "TV-like" interface, a user may be able to select a program to output on the multimedia interface and control playback features of the program on the interface. The program played on the player tracking unit may be downloaded from a remote server.

In other embodiments, the multimedia interface may be used to augment features of a main game played on a gaming machine including main games involving cooperative game play and competitive game play. The player tracking unit may be capable of peer-to-peer communications with other player tracking units. The peer-to-peer communication link may be used to send messages between player tracking units that allow two users to communicate using the multimedia interfaces on player tracking units. In yet another embodiment, the player tracking unit may be capable of downloading and storing gaming software that may be executed on the player tracking unit or the gaming machine to which the player tracking unit is connected. The gaming software may be downloaded from a remote server, another gaming machine or another player tracking unit.

One aspect of the invention provides a player tracking unit. The player tracking unit may be generally characterized as comprising: 1) a multimedia interface, 2) one or more of the following player tracking interface devices: a card reader, a key pad, a bonus button, a function button, a microphone, sound projection devices, a camera, a wireless interface device, a proximity sensor, selection buttons, an enter button, a bar-code reader, an RFID reader and a finger print reader; 3) a player tracking controller designed or configured to: i) communicate with the multimedia interface, the one or more player tracking interface devices, a master gaming controller that controls a game played on a gaming machine and one or more remote servers, ii) output a program comprising one of audio content, video content and combinations thereof, to the multimedia interface; and 4) a multimedia board for processing digitally formatted program files for output on the multimedia interface. The multimedia interface may comprise a display and an audio interface for connecting to one or more sound projection devices. Thus, the multimedia interface may comprise one or more sound projection devices connected to the audio interface.

In particular embodiments, the player tracking controller may be further designed or configured to receive a program selection for playback on the multimedia interface. Therefore, the multimedia interface may further comprise one or more input devices for selecting programs for output on the multimedia interface and for controlling playback features of the multimedia interface. For example, the program selection may be input into the player tracking unit from one or more of: 1) of a touch screen interface, 2) a wireless remote control in communication with the player tracking unit via the wireless interface, 3) the key pad, 4) the selection buttons, 5) the enter button, 6) the microphone and 7) combinations thereof. The playback features may be selected from the group consisting of pause, stop, play, forward, rewind and volume level.

The wireless interface device may be capable of receiving input from a wireless remote wherein the wireless remote control may be used for selecting the program for playback and for controlling playback features of the program. The wireless remote control may be configured like a TV/VCR remote control interface. Further, the player tracking unit may include the enter button and the selection buttons where the enter buttons and the selection buttons are configured like a TV/VCR remote control interface.

In other embodiments, the player tracking controller may be further designed or configured to display a menu of programs on the display that are available for output on the multimedia interface. The programs may be selected from a video-on-demand menu, which provides a plurality of video program selections. Also, the player tracking controller may be further designed or configured to display a menu of audio program selections that are available for output on the multimedia interface. In addition, the player tracking unit may comprise an audio input interface for inputting musical selections from a portable music device for output on the multimedia interface. In general, many different types of programs may be output on the player tracking unit, such as but not limited to an advertisement, news, stock quotes, electronic mail, a web page, a message service, a locator service and a hotel/casino service, a movie, a musical selection or a broadcast event. For program presentation, the player tracking controller may be further designed or configured to provide one of a video player, an audio player and a web-browser on the multimedia interface.

A program that is selected for output on the multimedia interface may be downloaded to the player tracking unit from a remote server. Further, the player tracking controller may be further designed or configured to download programs for output on the multimedia interface from one at least one of a player tracking unit, a gaming machine, a remote server, a portable input device and combinations thereof. The multimedia board may be capable of processing programs received by the player tracking unit that are downloaded in a streaming format.

In yet another embodiment, the player tracking controller may be further designed or configured to download gaming software for execution by at least one of the player tracking controller and the master gaming controller from one at least one of a player tracking unit, a gaming machine, a remote server, a portable input device and combinations thereof. The gaming software may be cached on the player tracking unit. Therefore, the player tracking unit may include a mass storage where the mass storage device is for storing one or more of programs, player tracking software, gaming machine software and combinations thereof.

In another embodiment, the player tracking unit may include a memory device storing a plurality of attract programs for output on the multimedia interface where the attract programs are played according to a schedule. The player tracking unit may include a proximity detector where a first attract program is output to the multimedia interface in response to a signal from the proximity indicating a nearby user. The attract programs may be downloaded to the player tracking unit from a remote server and stored on the memory device. The attract programs stored on the memory device may be varied with time. For example, the video content and the audio content used in the attract programs may be selected to match a holiday theme.

The player tracking controller may be further designed or configured for peer-to-peer communications with one or more other player tracking units. The peer-to-peer communications may allow a user of the player tracking unit to communicate with a second user on a second player tracking unit. Therefore, the player tracking controller may be further designed or configured to send messages including one or more of video content, audio content and text for display on a multimedia interface on a second player tracking unit.

The player tracking controller may be further designed or configured to provide a feature on the multimedia interface used in one of competitive game play or cooperative game play. For instance, the feature may be a status display for the competitive game play or the cooperative game play. Also, the player tracking controller may be further designed or configured to provide a feature that augments a game of chance generated by the master gaming controller. In addition, the player tracking controller may be further designed or configured to control a game played on the multimedia interface where the game is one of a bonus game and a game of chance.

The player tracking controller may be further designed or configured to register one of the player tracking unit, a gaming machine and combinations thereof with one or more remote servers. The remote servers are selected from the group consisting of a dynamic host configuration protocol server, a network time protocol server, a file transfer protocol server, a floor controller server, a player tracking/accounting server. When gaming machines are moved from one location to another, the registration process may help to streamline the relocation process.

The player tracking unit may comprise a number of different devices. For instance, the player tracking unit may comprise a network interface, such as an Ethernet Interface on the multimedia board. Further, the multimedia board may comprise at least one of an Ethernet interface, a digital audio/video decoder, an NTSC/PAL decoder, a video output interface, a video input interface, a USB interface, a PCI interface, an IDE interface, an ISA interface, a CPU, a graphics card, a USB interface, a wireless interface, an audio output interface, an audio input interface, an audio codec (coder/decoder), a microphone input interface, a memory interface and combinations thereof. Also, the player tracking unit may include one or more of a CD player, an FM/AM tuner, a DVD player, a TV tuner, a hard-drive and combinations thereof. The display is at least one of a LCD display, a plasma display and a CRT where the display is between about 3 inches and about 15 inches in diameter. The player tracking controller is designed or configured to communicate with the various devices using at least one of a USB communication standard, an IEEE 1394 communication standard or a Firewire communication standard.

Another aspect of the present invention provides gaming machine with a master gaming controller designed or configured to control one or more games of chance played on the gaming machine and a player tracking unit. The player tracking unit may be generally characterized as comprising: 1) a multimedia interface, 2) one or more of the following player tracking interface devices: a card reader, a key pad, a bonus button, a function button, a microphone, sound projection devices, a camera, a wireless interface device, a proximity sensor, selection buttons, an enter button, a bar-code reader, an RFID reader and a finger print reader; 3) a player tracking controller designed or configured to: i) communicate with the multimedia interface, the one or more player tracking interface devices, the master gaming controller and one or more remote servers, ii) output a program comprising one of audio content, video content and combinations thereof, to the multimedia interface; and 4) a multimedia board for processing digitally formatted program files for output on the multimedia interface. The multimedia interface may comprise a display and an audio interface for connecting to one or more sound projection devices.

In particular embodiments, the player tracking controller may be designed for peer-to-peer communications with one or more other player tracking units. Further, the player tracking controller may be designed to provide a feature that augments the game of chance generated by the master gaming controller on the gaming machine. The one or more games of chance that may be played on the gaming machine may be selected from the group consisting of video slot games, mechanical slot games, video black jack games, video poker games, video keno games, video pachinko games, video card games, video games of chance and combinations thereof.

In other embodiments, the multimedia interface may further comprise one or more input devices for selecting programs for output on the multimedia interface and for controlling playback features of the multimedia interface. For instance, the wireless interface device may be capable of receiving input from a wireless remote control where the wireless remote control is for selecting the program for playback on the player tracking unit and for controlling playback features of the program.

The player tracking controller may be designed to display a menu of programs on the display that are available for output on the multimedia interface and to receive a program selection for playback on the multimedia interface. For instance, the program may be selected from a video-on-demand menu providing a plurality of video program selections. Many different types of programs may be output to the multimedia interface including but not limited to an advertisement, news, stock quotes, electronic mail, a web page, a message service, a locator service and a hotel/casino service, a movie, a musical selection or a broadcast event.

A selected program may be downloaded to the player tracking unit from a remote server. Further, the player tracking controller may be designed to download programs for output on the multimedia interface from one at least one of a player tracking unit, a gaming machine, a remote server, a portable input device and combinations thereof. The multimedia board is capable of processing programs received by the player tracking unit in a streaming format, such as a program downloaded from a remote audio/video content server. In addition to downloading programs, the player tracking controller may be designed to download gaming software for execution by at least one of the player tracking controller and the master gaming controller from one at least one of a player tracking unit, a gaming machine, a remote server, a portable input device and combinations thereof.

Another aspect of the present invention may provide a player tracking system. The player tracking system may be general characterized as comprising: 1) one or more remote server, 2) a plurality of gaming machines with player tracking units and 3) a network designed or configured to allow communications between the plurality of gaming machines, the player tracking units on the gaming machines and the one or more remote servers. The one or more remote servers in the network may be selected from the group consisting of a player tracking/accounting server, a video/audio content server, a messaging server, a gaming software server and a cashless system server. The gaming machine may comprise a master gaming controller designed or configured to control one or more games of chance played on the gaming machine and a player tracking unit. The player tracking unit may be generally characterized as comprising: 1) a multimedia interface, 2) one or more of the following player tracking interface devices: a card reader, a key pad, a bonus button, a function button, a microphone, sound projection devices, a camera, a wireless interface device, a proximity sensor, selection buttons, an enter button, a bar-code reader, an RFID reader and a finger print reader; 3) a player tracking controller designed or configured to: i) communicate with the multimedia interface, the one or more player tracking interface devices, the master gaming controller and one or more remote servers, ii) output a program comprising one of audio content, video content and combinations thereof, to the multimedia interface; and 4) a multimedia board for processing digitally formatted program files for output on the multimedia interface. The multimedia interface may comprise a display and an audio interface for connecting to one or more sound projection devices.

These and other features and advantages of the invention will be spelled out in more detail below with reference to the associated drawings.

DESCRIPTION OF THE PREFERRED EMBODIMENTS

Figure 2A:
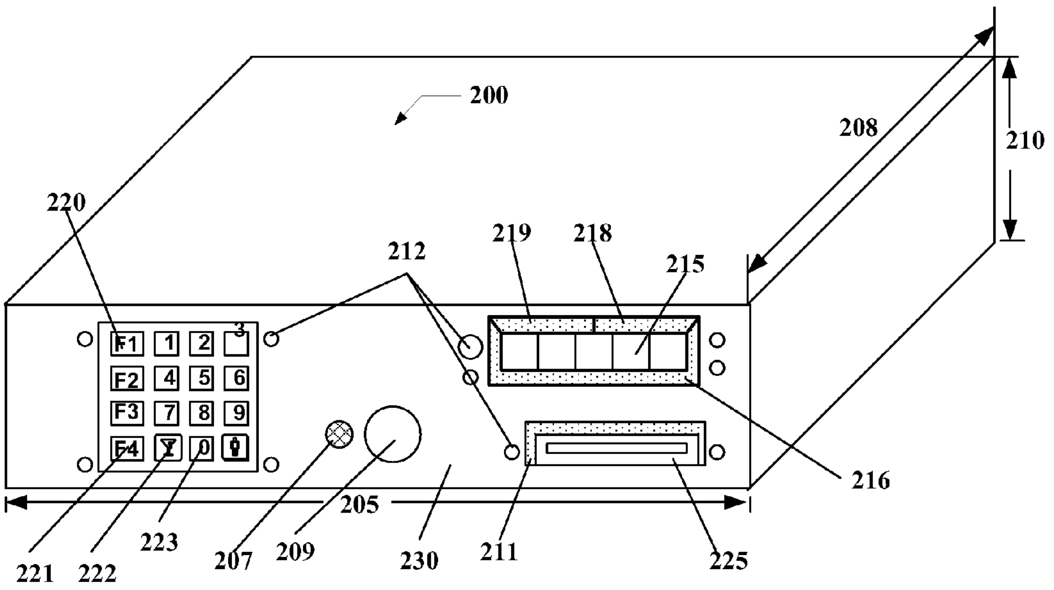
FIGS. 2A and 2C are perspective diagrams of a player tracking units of the present invention.
Figure 2B:
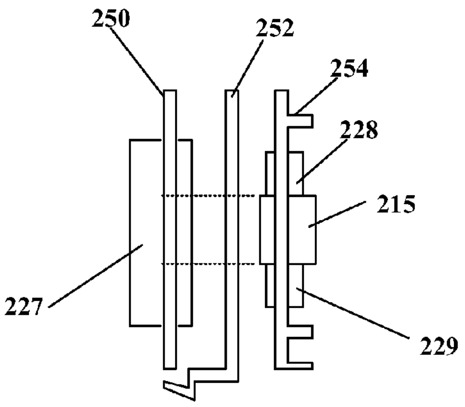
FIG. 2B is a mounting system for attaching an interface peripheral used as a player tracking device to a player tracking unit of the present invention.
Figure 2C:
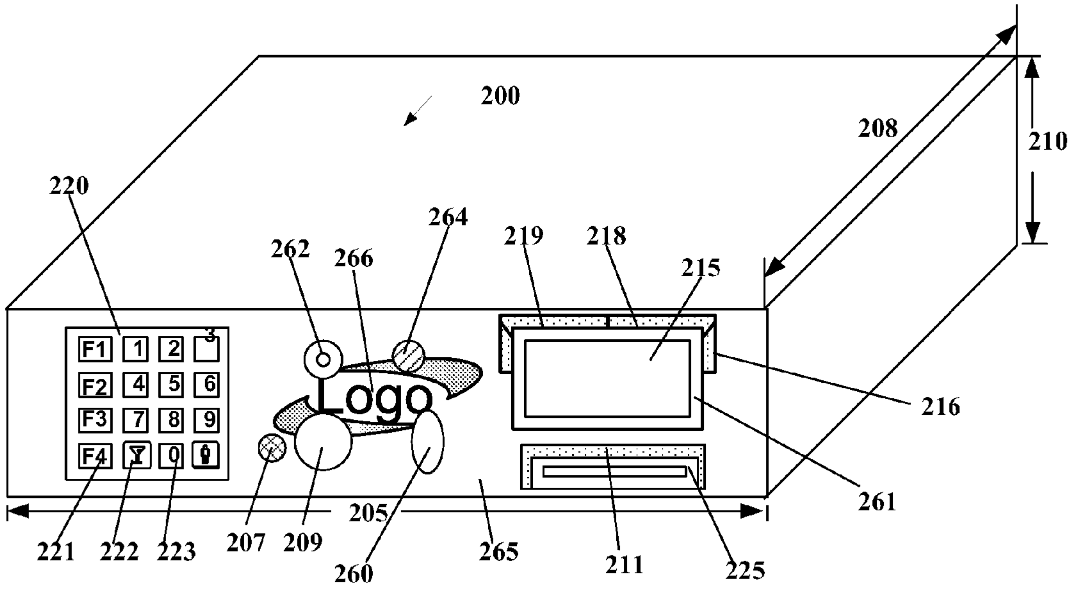

FIGS. 2A and 2C are perspective diagrams of different embodiments of player tracking units of the present invention. FIG. 2B is a mounting system for attaching a player tracking device to a player tracking unit of the present invention. FIG. 2A is a front diagram for a housing or chassis 200 enclosing a number of interface peripherals. The interface peripherals may be used to provide input and output (I/O) to a player tracking system or may be used to provide I/O to other gaming systems such as a gaming machine. The device housing 200 may enclose a logic device (not shown) and other electronics configured to execute player tracking functions or the logic device may be enclosed in a logic device housing separate from the device housing 200.

Using the player tracking interface devices enclosed in the housing 200, gaming information, such as player tracking information, may be input to the player tracking unit and gaming information may be visually and aurally communicated to various individuals that may use the player tracking unit, such as game players, casino service representatives and maintenance technicians. Aspects of the present invention involve using illumination devices, such as back lit key pad buttons (e.g. 221, 222 and 223), light 211 and light 216 and sound projection devices, such as speaker 209, to visually and/or aurally communicate game information. The function buttons, F1, F2, F3 and F4 (i.e. 221) may be used to provide various services through the player tracking unit. Thus, in the following paragraphs, player tracking device hardware, its integration into the device housing 200 and methods for visually and aurally communicating gaming information using the hardware devices, are described.

The device housing 200 encloses a display 215, a key pad 220, a microphone 207, a speaker 209, a card reader 225, a light 216 adjacent to the card reader 225 and a light 216 adjacent to the display 215. In other embodiments, the housing 200 may enclose many different combinations of player tracking interface devices. For instance, additional gaming devices, such as biometric input devices, wireless interface devices cameras and bonus buttons, may also be enclosed in the device housing (see FIG. 2C). In one embodiment, face plate 230 surrounds the display 215, the key pad 220, the card reader 225, the light 216, the light 211, the microphone 207 and the speaker 209. The face plate 230 may include mounting holes, such as 212, for mounting various player tracking interface devices to the face plate 230 such as the display 215 (see FIG. 2B).

The face plate 230 includes cut-outs (not shown) that may allow access to the player tracking interface devices. For instance, a front portion of the light 216, a front portion of the display 215, and a front portion of the key pad are visible through the face plate 230. Each of the key pad buttons, such as 221, 222 and 223, may be back-lit by illumination devices of some type. The illumination devices, behind the key pad buttons, may be independently controlled to display various light and color patterns. The light and color patterns may be used to represent game information. Details of a back-lit key pad used to convey gaming information are described in co-pending U.S. application Ser. No. 09/476,143, filed Jan. 3, 2000, by Powell et al., entitled, "A MICROCONTROLLED BACKLIT KEYPAD ASSEMBLY AND METHOD FOR A GAMING MACHINE" which is incorporated herein in its entirety and for all purposes.

The dimensions of the device housing 200, (e.g. 205, 208 and 210) are shown in FIGS. 2A and 2C. The device housing 200 is shown as a rectangular box for illustrative purposes only. A shape of the device housing 200 is variable and is not strictly limited to rectangular shapes. Further, dimensions of the cut-outs on the face plate 230 for the player tracking interface devices may vary depending the manufacturer of a particular interface peripheral device which may be used in a player tracking device. Typically, the dimensions of player tracking interface devices vary from manufacturer to manufacturer.

The light 216, adjacent to the display 215 may use one or more illumination devices. Further, the light 216 may employ one or more types of lighting systems such as light emitting diodes (LED's), neon bulbs, incandescent bulbs, halogen bulbs, florescent bulbs, electro-luminescent lighting elements or combination thereof. In a particular embodiment, the LED's may be multi-colored LED's. Details of providing electro-luminescent lighting elements to convey gaming information on a player tracking unit are described in co-pending U.S. provisional application (Attorney Docket No. IGT1P66P), filed May 4, 2001, by Winans, and entitled, "PLAYER TRACKING PANEL," which is incorporated herein in its entirety and for all purposes.

The light 216 may include a translucent cover 227 with different segments, such as 218 and 219. The cover 227 and cover segments 218 and 219 may be colored in some manner. For instance, cover segments 218 may be red and cover segment 219 may be blue while the remaining cover may be clear. The cover may be manufactured from a translucent plastic material. The cover segments 218 and 219 may protrude above the surface of face plate 230 to increase visibility of the light 216. The translucent cover may vary in shape. Depending on the lighting system used, the translucent cover may be removable to allow replacement of a defective bulb or other lighting system element.

The translucent cover 227 with cover segments 218 and 219, may enclose one or more illumination devices. For instance, cover segment 219 may enclose a plurality of LED's while cover segment 218 may enclose a neon bulb. The illumination of each of the illumination devices may be independently controlled by electronics (see FIG. 3) located within the device housing 200. The translucent cover may extend substantially surround the display 215 or the translucent cover may extend around a portion of the perimeter of the display 215 (see FIG. 2C). The display 215 may be an LED, LCD, vacuum florescent, plasma display screen or any other type of display technology.

The location of the illumination devices within light 216 may be used to indicate different types of gaming information. In one embodiment, illumination devices located below cover segment 219 may be operated in some manner to visually communicate player status information while illumination devices located below cover segment 218 may be used to indicated card status information for a card inserted in the card reader 225. For instance, for an especially valued customer, cover segment 219 may be illuminated in a shade of green while cover segment 218 remains unilluminated. As another example, when a card is inserted incorrectly in the card reader 225, such as the card is inserted up-side down, cover segment 218 may be illuminated with a flashing red pattern while cover segment 219 remains unilluminated. In some embodiments, depending on the type of gaming information being displayed, two or more illumination devices on light 216 may be illuminated simultaneously where each of the illumination devices is used to convey a different type of gaming information. For instance, a first illumination device may be illuminated in some manner to visually communicate player status information, while a second illumination device may be used to communicate card status information and while a third illumination device may be used to communicate an error condition on the player tracking unit where combinations of two or more of the illumination devices may be illuminated at the same time.

FIGS. 2B is a mounting system for attaching a display 215 to a device housing 200 for one embodiment the present invention. Many mounting systems may be used with the present invention and the example in FIG. 2B is provided for illustrative purposes only. The display 215 and LED's, 228 and 229, are attached to the mount 254 which is secured with a decorative plate 252 to a decorative skin 250 of polycarbonate plastic material. Typically, the decorative skin 250 is silk-screened to add a particular graphic design. In some embodiments, the LED's or other illumination devices of the present invention may also be secured to the display 215. The cover 227 for the illumination devices 228 and 229 is shown protruding through and above the decorative skin 250. Attachment means are used to secure the display 215 to the mount 254 and/or the device housing 200. Attachment means (not shown) are also used to secure the other player tracking interface devices, such as the card reader 225, the key pad 220, the microphone 207 and the speaker 209 to the device housing 300.

FIG. 2C is a front diagram for a housing or chassis 200 enclosing a number of interface peripherals which may be used as player tracking interface devices, for one embodiment of the present invention. The front plate 230 is covered with a decorative skin 265 with a silk-screen logo 266. In addition to the player tracking interface devices described with respect to FIG. 2A, the player tracking housing 200 includes a wireless interface 264, a camera 262 and a finger-print reader with platen 260.

The display 215 is a color LCD. Other display technologies such as organic electro-luminescent devices may be used with the display 215. A portion of the LCD 215 may be used at times to visually convey gaming information as described in regards to light 216. For instance, a border region 261 around the perimeter of the display may flash green to indicate a player has requested a drink. In this embodiment, the light 216 surrounds a top portion of the display 215 and parts of the side of display 215. In another embodiment, the light 216 may be located across the top portion of the display 215.

The camera 262 may be used for security purposes, promotional purposes and to enter biometric information. For instance, the camera 262 may deter tampering with a player tracking unit or gaming machine. As another example, a picture of a player may be recorded when they win a jackpot and used for a promotion. As another example, the camera may be used with feature recognition software to identify the player. Similarly, the finger-print reader 260 may be used to read a player's fingerprint which is used to determine their identity. As another example, the microphone 207 may be used with voice recognition software to recognize a player's voice for player authentication purposes. Thus, a voice signal input into the microphone 207 may be compared with a stored voice print to identify the player. In some embodiments, biometric input devices may be used to supplement information read from a card inserted in the card reader or to even replace the card reader 225. A description of a finger print reader as an identification device is provided in co-pending U.S. application Ser. No. 09/172,787, filed Oct. 14, 1998, by Wells, et al., entitled "Gaming Device Identification method and Apparatus," which is incorporated herein in its entirety and for all purposes.

The wireless interface 264 may be used to communicate with a portable wireless device worn or carried by a player, a casino service representative or maintenance technician. For example, rather than inserting a card into the card reader 225, a player may wear or simply carry a wireless communication device that may be about the size of a player tracking card. When the player is near the machine, a wireless interface device 264 and the wireless device worn by the player may automatically detect each other establish communications allowing gaming information to be transferred between the wireless devices.

As example, the wireless interface device 264 may use a wireless communication standard such as Bluetooth™ to communicate with portable wireless devices using this standard although other wireless communication protocols such as IEEE 802.11a, IEEE 802.11b, IEEE 802.11x (e.g. other IEE802.11 standards), hiperlan/2, and HomeRF may also be used. Bluetooth devices communicate on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface device 264 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com.

In another embodiment of the present invention, the microphone 207 and speaker 209 may be used to input gaming information and aurally communicate gaming information. For instance, the microphone 207 may be used with voice recognition software executed by: a) a logic device on the player tracking unit or b) a master gaming controller in a gaming machine, may be used recognize verbal requests for gaming services. For instance, the player may request a drink by saying "order me a drink" into the microphone 207.

The speaker 209 may be used to aurally communicate gaming information to the player or someone else using the gaming machine. For instance, when a card has been inserted incorrectly in the card reader 225. A message, such as "card not inserted correctly," may be projected from the speaker. Simultaneously, although not required, the light 216 may flash red to draw the players attention. Voice messages from the speaker 209 may be projected in different languages. For example, for a Japanese speaking game player messages may be in Japanese, for a Spanish speaking game player the messages may be in Spanish while for an English speaking player the messages may be in English. The language preferred by the player may be stored as player tracking information on a player tracking card or the player may be able to specify their language using one of the input devices on the player tracking unit. The player tracking information on the player tracking card may be based on a user profile previously established by the player which may be used to select the language used by the player.

In general, the same game information may be communication visually, aurally or both visually and aurally. Further, one type of game information may be communicated only aurally while another type of game information may be communicated only visually. For visual communication of game information, combinations of illumination devices in the light 216, the light 211 and the back-lit key pad buttons (e.g. 221, 222 and 223) may be illuminated in different color and light patterns that may vary with time and may last for only a specific duration. For instance, when the gaming machine has been idle for a specific period time some of the lights (e.g. 216 or 211) on the housing 200 may flash in a pattern for a specific amount of time at specific intervals to attract a player's attention. As another example, an error condition detected in the player tracking unit may result in visual response which remains on until the error condition is cleared by an operator. For aural communication of game information, various sounds and verbal message may be projected from a sound projection device such as the speaker 209. These sounds or messages may vary with time and may last for a specific duration of time.

The player tracking housing 200 may be installed in a gaming machine. In response to a game event or bonus game event generated from the game played on the gaming machine, the illumination devices may be illuminated and/or a sound may be projected from the sound projection device. The game event or bonus game event may also be generated from a game played on one or more gaming machines in communication with the gaming machine where the player tracking housing 200 is mounted such as gaming machines connected together around a gaming carousel. In addition, the game event may be generated from a remote gaming device such as player tracking server connected to the gaming machine. For example, all players playing a group of gaming machines (e.g. 25 cent denomination machines) in communication with the remote gaming device may be awarded free credits, free airline miles, or another prize. As another example, in response to a signal generated from a proximity sensor on the player tracking unit, such as an infrared device or a Bluetooth device that is activated when a person is in front of the gaming machine, the illumination devices may be illuminated and/or a sound may be projected from the sound projection device to attract a player's attention.

In particular embodiments, to indicate a status of a card inserted in the card reader 225, the one or more of the illumination devices may illuminated and/or a sound, such as a voice message, may be projected from the sound projection device. The card status may be an invalid card, an abandoned card or an incorrectly inserted card. In addition, the one or more illumination devices may be illuminated and/or a sound may be projected from the sound projection device to indicate 1) a special status of a player, 2) to indicate an amount of credits (e.g., 51, 105, 205, etc.), a range of credits (e.g. 0-100, 101-200, 201-300, etc.) or a level (e.g. 1000 points=level 1, 5000 points=level 2 and win a free jacket, 15,000=level 3 and win a free trip; points may be player tracking points or some other point system) earned by the player during a game play session on the gaming machine, 3) to indicate a service request by the player such as a drink request, 4) to indicate a status of a gaming device located on the gaming machine such as a hopper, a drop door or a printer, 5) a status one or more of the player tracking interface devices located on said player tracking unit, 6) a jackpot is pending and requires a "hand" payout, 7) an error condition has been detected on the gaming machine or the player tracking unit and 8) a special promotion is being offered at a gaming establishment where the player tracking unit is installed. The special promotion may be a live video broadcast, dinner shows, gifts as well as other goods and services. Many different types of gaming information may be visually or aurally communicated using the present invention and is not limited to the examples provided above.

Figure 3:
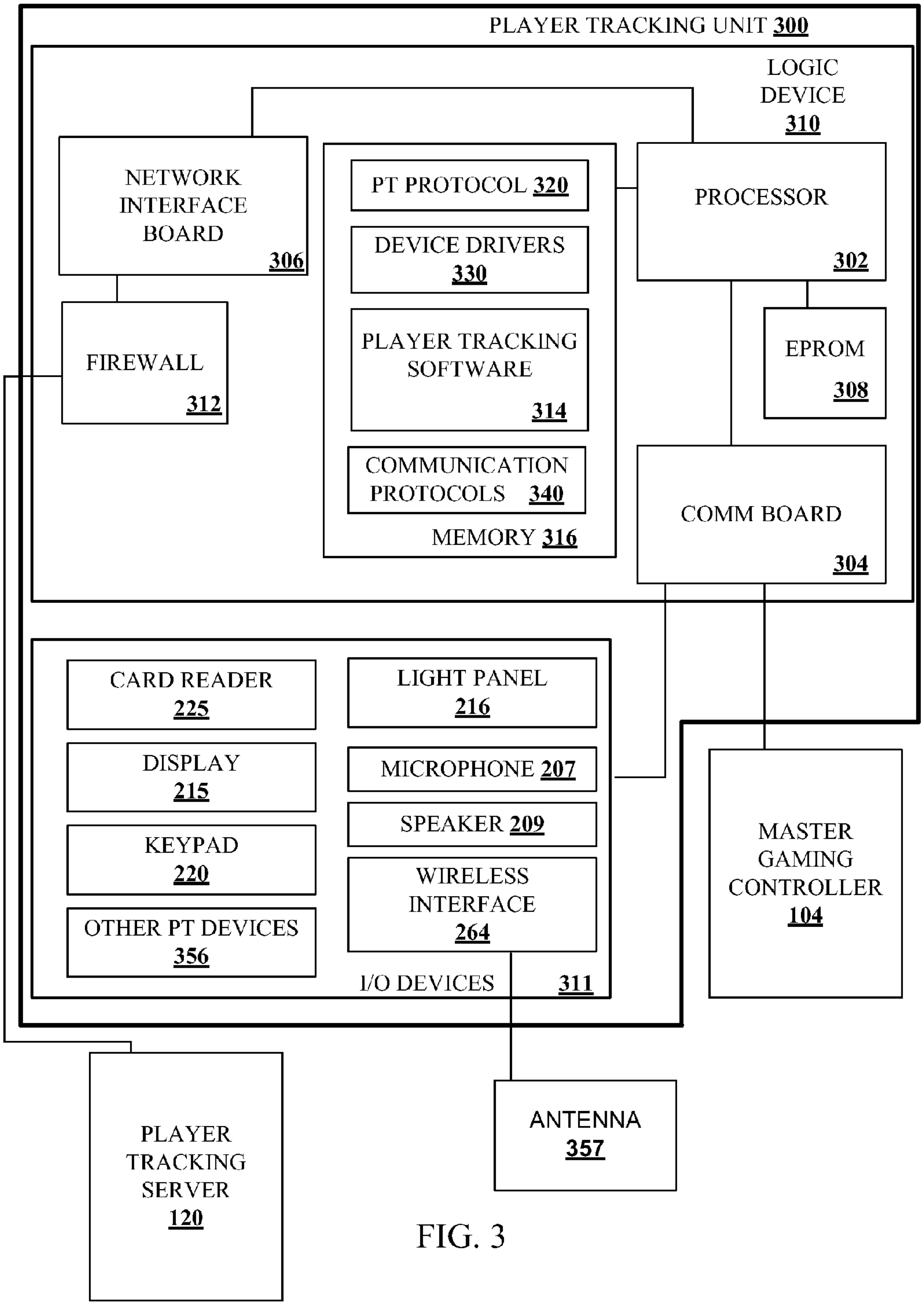
FIG. 3 is a block diagram of the components of a player tracking unit of the present invention.

FIG. 3 is a block diagram of an embodiment of a player tracking unit 300 of the present invention connected to a master gaming controller 104 on a gaming machine and a player tracking server 120. The player tracking unit 300 includes a logic device 310 enclosed in a logic device housing and a number of player tracking interface devices including a card reader 225, a display 215, a key pad 220, a light panel 216, a microphone 207, a speaker 209, a wireless interface and other player tracking interface devices 356 enclosed in a device housing 311. The logic device 310 for the player tracking unit and the player tracking interface devices may be enclosed in a single housing (see FIGS. 2A-2C) or separate housings.

The logic device 310 may include a processor for executing software allowing the player tracking unit to perform various player tracking functions such as communicating with the player tracking server 120, communicating with the master gaming controller 104 or operating the various peripheral devices such as the card reader 225, the display 215, the key pad 220 and the light panel 216. For instance, the logic device 310 may send messages containing player tracking information to the display 215. As another example, the logic device 310 may send commands to the light panel 216 to display a particular light pattern and to the speaker 209 to project a sound to visually and aurally convey game information. The logic device 310 may utilize a microprocessor and/or microcontrollers. For instance, the light panel 216 may include a microcontroller that converts signals from the processor 302 to voltage levels for one or more illumination devices. In one embodiment, application software for the player tracking unit 300 and configuration information for the player tracking unit may be stored in a memory device such as an EPROM 308, a non-volatile memory, hard drive or a flash memory.

The player tracking unit may include a memory 316 configured to store: 1) player tracking software 314 such as data collection software, 2) player tracking communication protocols (e.g.320) allowing the player tracking unit 300 to communicate with different types of player tracking servers, 3) device drivers for many types of player tracking interface devices (e.g. 330 ), 4) voice recognition software for receiving voice commands from the microphone 207, 5) a secondary memory storage device such as a non-volatile memory device, configured to store gaming software related information (The gaming software related information and memory may be used in a game download process or other software download process.), and 6) communication transport protocols (e.g. 340) such as TCP/IP, USB, Firewire, IEEE1394, Bluetooth, IEEE 802.11a, IEEE 802.11b, IEEE 802.11x (e.g. other IEEE 802.11 standards), hiperlan/2, and HomeRF allowing the player tracking unit to communicate with devices using these protocols or communication protocols allowing the logic device to communicate with different types of master gaming controllers (e.g. master gaming controllers using different types of communication protocols), such as 104. Typically, the master gaming controller, such as 104, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316 for each type of player tracking device. For example, device drivers for five different types of card readers, six different types of displays and 8 different types of key pads may be stored in the memory 316. When one type of a particular peripheral device is exchanged for another type of the particular device, a new device driver may be loaded from the memory 316 by the processor 302 to allow communication with the device. For instance, one type of card reader in the player tracking unit 300 may be replaced with a second type of card reader where device drivers for both card readers are stored in the memory 316.

In some embodiments, the software units stored in the memory 316 may be upgraded as needed. For instance, when the memory 316 is a hard drive, new device drivers or new communication protocols may be uploaded to the memory from the master gaming controller 104, the player tracking server 120 or from some other external device. As another example, when the memory 316 is a CD/DVD drive containing a CD/DVD designed or configured to store the player tracking software 314, the device drivers and other communication protocols, the software stored in the memory may be upgraded by replacing a first CD/DVD with a second CD/DVD. In yet another example, when the memory 316 uses one or more flash memory units designed or configured to store the player tracking software 314, the device drivers and other communication protocols, the software stored in the flash memory units may be upgraded by replacing one or more flash memory units with new flash memory units storing the upgraded software. In another embodiment, one or more of the memory devices, such as the hard-drive, may be employed in a game software or player tracking software download process from a remote software server.

In one embodiment of the present invention, a minimal set of player tracking software applications 314, communication protocols 340, player tracking communication protocols and device drivers may be stored on in the memory 316. For instance, an operating system, a communication protocol allowing the player tracking unit 300 to communicate with a remote server such as the player tracking server 120 and one or more common player tracking applications may be stored in memory 316. When the player tracking unit is powered-up, the player tracking unit 300 may contact a remote server 120 and download specific player tracking software from the remote software. The downloaded software may include but is not limited to one or more particular player tracking applications that are supported by the remote server, particular device drivers, player tracking software upgrades, and a particular communication protocol supported by the remote server. Details of this method are described in co-pending U.S. application Ser. No. 09/838,033, filed on Mar. 19, 2001, by Criss-Puskiewicz, et al., entitled, "UNIVERSAL PLAYER TRACKING SYSTEM," which is incorporated herein in its entirety and all for purposes In some embodiments, the player tracking functions may be implemented by both the logic device 310 and the master gaming controller 104. For instance, the master gaming controller may execute voice recognition software to interpret voice commands input from the microphone 207. Thus, player tracking software such as the player tracking protocols may be stored on a memory located on the gaming machine which is separate from the player tracking unit. In some embodiments, the player tracking software stored on the memory on the gaming machine may be executed by the master gaming controller 104 on the gaming machine in other embodiments, the player tracking software stored on the memory on the gaming machine may be executed by the logic device 310 on the player tracking unit.

The logic device 310 includes a network interface board 306 configured or designed to allow communication between the player tracking unit 300 and other remote devices such as the player tracking server residing on local area networks, such as a casino area network, a personal area network such as a piconet (e.g. using Bluetooth), or a wide area network such as the Internet. The network interface board 306 may allow wireless or wired communication with the remote devices. The network interface board may be connected to a firewall 312. The firewall may be hardware, software or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 304 may be configured to allow communication between the logic device 310 and the player tracking interface devices including 225, 215, 220, 216, 207, 209 and 356 and to allow communication between the logic device 310 and the master gaming controller 104. The wireless interface 264 may be used to allow the player tracking unit and possibly the master gaming controller 104 to communicate with portable wireless devices or stationary devices using a wireless communication standard. The wireless interface 264 may be connected to an antenna 357. In some embodiments, the wireless interface 264 may be incorporated into the communication board 304. In addition, in some embodiments, the logic device 310 and the master gaming controller 104 may communicate using a non-proprietary standard wireless communication protocol such as Bluetooth, IEEE 802.11a, IEE802.11b, IEEE802.11x (e.g. other IEEE802.11 standards), hiperlan/2, and HomeRF or using a non-proprietary standard wired communication protocol such as USB, Firewire, IEEE 1394 and the like. In the past, gaming machine have primarily used proprietary standards for communications between gaming devices. In other embodiments, the logic device 310 and the master gaming controller may communicate using a proprietary communication protocol used by the manufacturer of the gaming machine.

The communication between the player tracking unit 300 and 1) the player tracking interface devices, 2) the master gaming controller 104, 3) the player tracking server 120 and 4) any other external or internal gaming devices may be encrypted. In one embodiment, the logic device 310 may poll the player tracking interface devices for information. For instance, the logic device 310 may poll the card reader 225 to determine when a card has been inserted into the card reader or may poll the key pad 220 to determine when a button key has been depressed. In some embodiments, the player tracking interface devices may contact the logic device 310 when a player tracking event such as a card being inserted into the card reader has occurred.

The logic device 310 may poll the master gaming controller 104 for game usage information. For instance, the logic device 310 may send a message to the master gaming controller 104 such as "coin-in". The master gaming controller may respond to the "coin-in" message with an amount when credits are registered on the gaming machine.

The logic device 310, using an appropriate device driver, may send instructions to the various player tracking interface devices to perform specific operations. For instance, after a card has been inserted into the card reader 225, the processor logic device may send a "read card" instruction to the card reader, a "display message A" instruction to the display 215 and a "good luck" voice message to speaker 209. In addition, the logic device 310 may be configured to allow the master gaming controller 104 to send instructions to the player tracking interface devices via the logic device 310. As an example, after a card has been inserted into the card reader 225, the processor logic 310 may determine that the card is for a gaming application controlled by the master gaming controller 204 and send a message to the master gaming controller 104 indicating a card has been inserted into the card reader. In response, to the message from the logic device, the master gaming controller 104 may send a series of commands to the player tracking interface devices such as a "read card" instruction to the card reader 225, a flash light pattern "A" command to the light panel 216, and a "display message" instruction to the display 215 via the logic device 310. The instructions from the master gaming controller 104 to the player tracking interface devices may be obtained from gaming application software executed by the master gaming controller 104. The gaming application software may or may not be related to player tracking services.

The player tracking unit 300 may include one or more standard peripheral communication connections (not shown). The logic device 310 may be designed or configured to communicate with the master gaming controller 104 and the player tracking interface devices using a standard peripheral connection, such as an USB connector, and using a standard communication protocol, such as USB. The USB standard allows for a number of standard USB connectors that may be used with the present invention. The player tracking unit 300 may contain a hub connected to the peripheral communication connection and containing a plurality of peripheral communication connections. Details of using a standard peripheral communication connection are described in U.S. Pat. No. 6,251,014, issued Jun. 26, 2001, by Stockdale, et al., entitled, "STANDARD PERIPHERAL COMMUNICATION," which is incorporated herein in its entirety and for all purposes.

Figure 1:
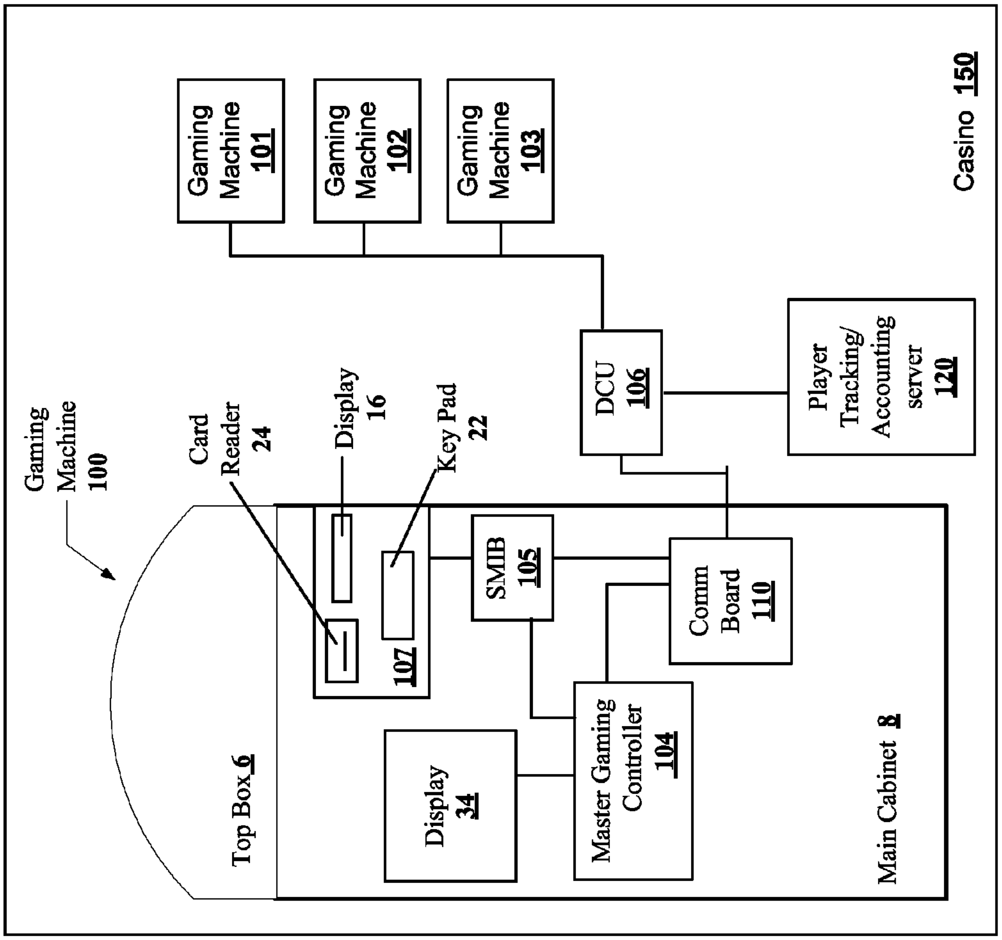
FIG. 1 is a block diagram of a number of gaming machines with player tracking units connected to servers providing player tracking services.
Figure 4:
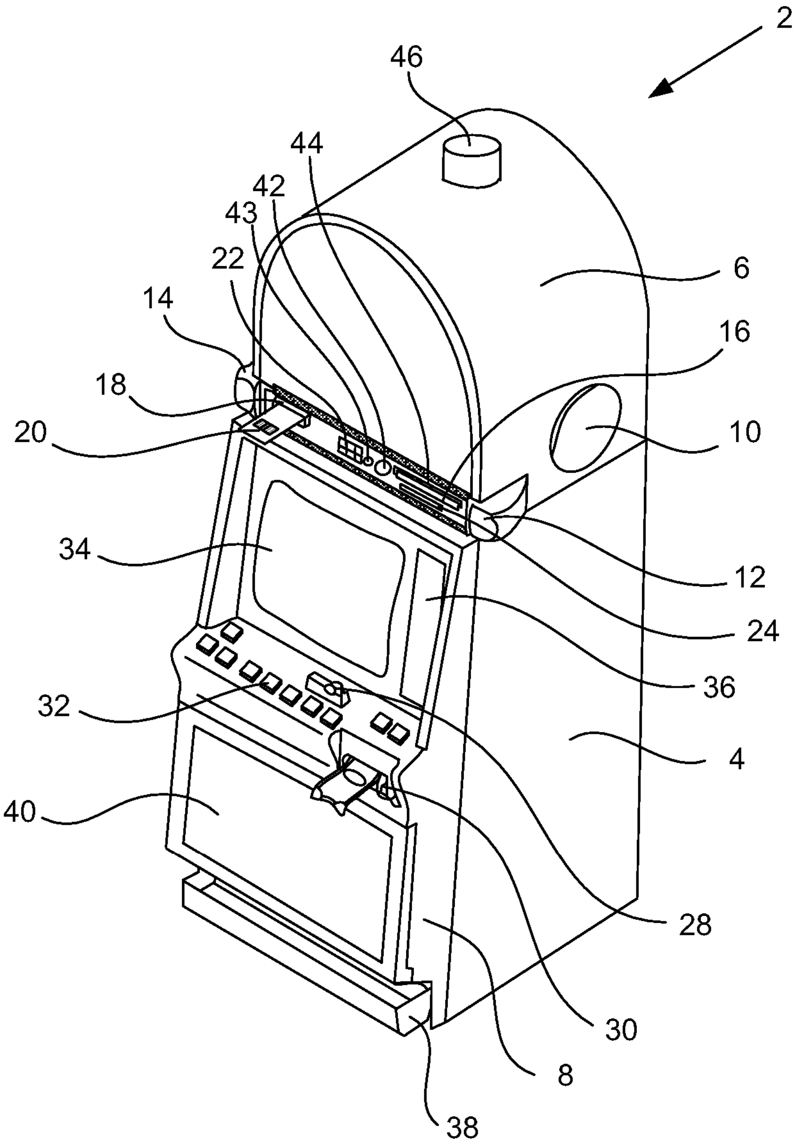
FIG. 4 is a perspective drawing of a video gaming machine of the present invention.

Turning to FIG. 4, more details of using a player tracking system in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 1) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. A player playing a game on the gaming machine 2 or a person near the gaming machine may view the light patterns from the light panel 216. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting their card, the player may be visually prompted on the display screen 16 or aurally prompted using the speaker to enter identification information such as a PIN code using the key pad 22. Typically, the player tracking card may remain in the card reader 24 during the game play session. As another example, the gaming machine may transfer player tracking information from portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or "comps" for the player such as free meals or free rooms. Usually, the player tracking card inserted into the card reader contains at least player tracking account information. When the card is inserted correctly into the card reader 24, the information stored on the card, such as the player's account information, may be read by the card reader and transferred by a logic device on the player tracking unit (see FIG. 3) to the player tracking server. The player tracking account information allows the player tracking server to store player tracking points accumulated during the game play session to the appropriate account. When player tracking information is not provided by the player, for instance, when the player tracking card has been inserted incorrectly into the card reader 24, player tracking points are not accumulated..

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services. In addition, when the player has inserted a player tracking card in the card reader to initiate a player tracking session, to prevent the player from leaving or "abandoning" their card in the card reader 24, a voice message, such as "please remove your card," may be projected from the sound projection device 44.

Figure 5:
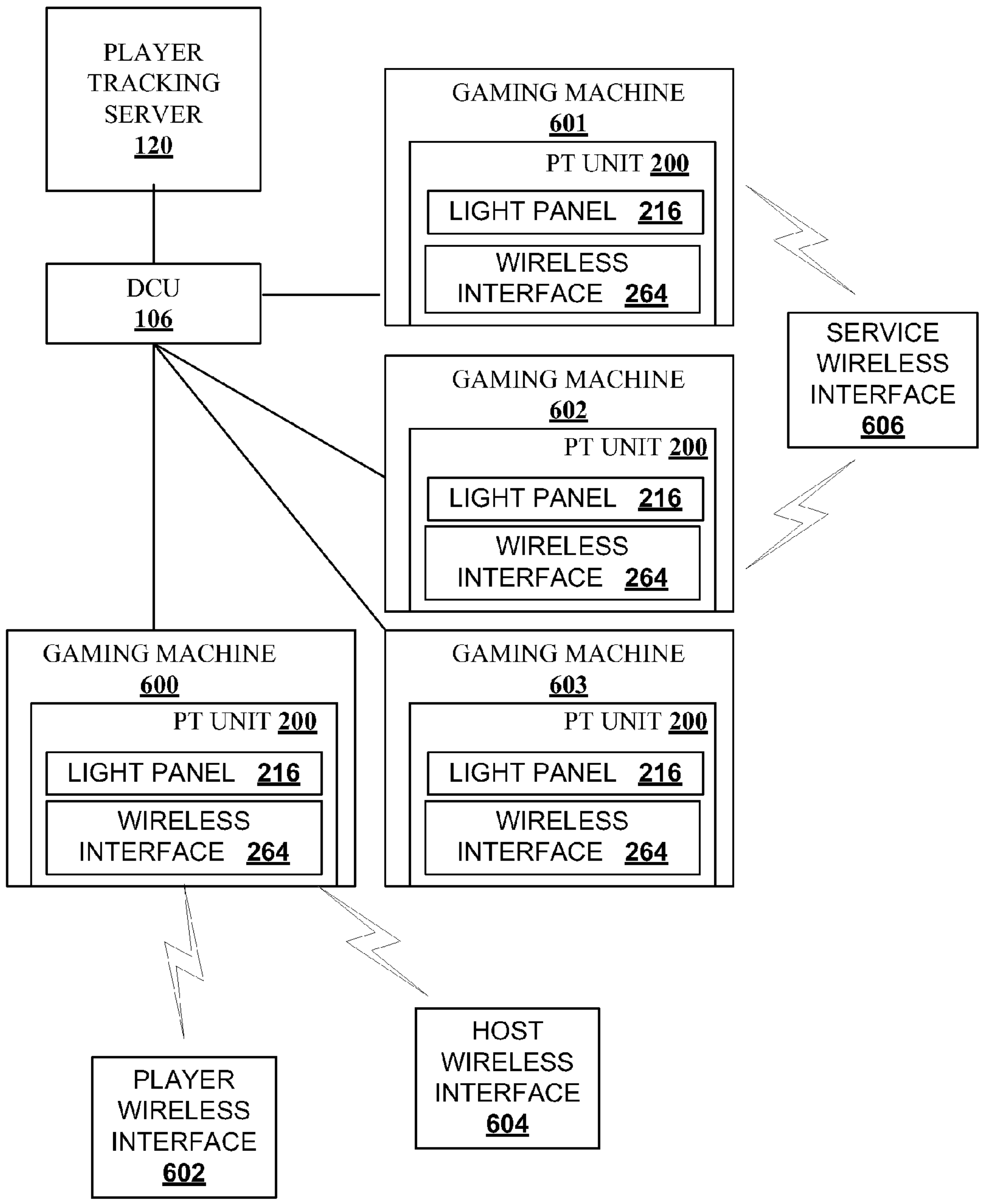
FIG. 5 is a block diagram of a number of gaming machines each with a player tracking unit connected in a player tracking system where the player tracking units use illumination devices and wireless interface devices to convey gaming information.

FIG. 5 is a block diagram of a number of gaming machines each with a player tracking unit connected in a player tracking system where the player tracking units utilize light panels and wireless interface devices to communicate gaming information. Four gaming machines 600, 601, 602 and 603 each with a player tracking unit 200, a light panel 216 and a wireless interface 264 are connected to the player tracking server 120 via the data collection unit 106. As described with respect to FIG. 2, the light panels 216 may be used to visually communicate gaming information to an interested parties, such as a game player, a casino service representative, or a maintenance technician. The wireless interface devices 264 may be used to communicate gaming information to a portable wireless devices carried by different individuals such as game players, casino service representatives or a maintenance technician. As described above, wireless communication standard such as Bluetooth, IEEE 802.11a, IEEE802.11b, IEEE802.11x (e.g. other EEE802.11 standards such as IEEE802.11c, IEEE802.11d, IEEE802.11e, etc.), hiperlan/2, and HomeRF, may be used to provide communications between the wireless interface device 264 and a portable wireless interface device.

The portable wireless devices carried by different individuals may be designed or configured to selectively establish communications with the player tracking units 200 broadcasting various messages via the wireless interfaces 264. For instance, a service wireless interface device 606 may be designed or configured to only establish communications with a player tracking unit when the unit is broadcasting a maintenance request message. Thus, when the service wireless interface device 606 receives another type of message, such as a message indicating a player has requested a drink, the device will ignore the message and not establish communications with the player tracking unit broadcasting that message. In another example, the host wireless interface device 604 may only establish communications with one of the player tracking units 200 when the player tracking unit has determined that a game player with "special" status is at their machine and then, sent a message indicating the status of the player to the host wireless interface device 604.

In one embodiment, a maintenance technician may carry a portable wireless interface device 606 used for service of a player tracking unit or a gaming machine. A light panel 216 on gaming machine 602 may display a message such as a flashing red light indicating the gaming machine or the player tracking unit requires service. The maintenance technician may see the flashing red light and approach the machine. As the maintenance technician approaches the gaming machine 602 carrying the service wireless interface device 606, in response to a maintenance request message broadcast via wireless interface 264 on gaming machine 602, the service wireless interface device may establish wireless communications with the gaming machine 602. In one embodiment, the service wireless interface device may be a personal digital assistant. The service wireless interface device may also receive broadcast messages from gaming machines 600, 601 and 603. However, unless these other gaming machines are also broadcasting a maintenance request message, the service wireless interface device 606 will not establish communications with these gaming machines. After establishing communications with gaming machine 602, the service wireless interface device 606 may receive information regarding the nature of the maintenance service request. For instance, an interface such as a display screen on the device 606 may display a message indicating a hopper needs to filled, a ticket tray needs to be filled or a gaming device is operating incorrectly. Based upon the information displayed on the wireless interface device 606, the maintenance technician may take an appropriate action such as filling the hopper.

In another embodiment, a casino service representative may wear portable wireless device, such as a watch with colored lights. The colored lights on the watch may be used to indicate the status of the player. For example, using a portable wireless interface device 602, the player may have established a player tracking session on gaming machine 600. When the casino service representative is within range of the wireless interface device 264 on gaming machine 600, such as walking by the player playing a game on a gaming machine, a light on their watch may flash green to indicate the player is a special customer. The light mechanism on their watch may be activated in response to gaming information received from the wireless interface device 264. The rate of flashing may increase as the casino service representative approaches the player so that the casino service representative can select the correct player if a number of players are playing nearby. The gaming information included in a message broadcast from gaming machine 600 may also indicate a location of the player such as a machine number where they are playing. Thus, a message may be displayed on a visual interface on the watch, such as "go to machine 600." The casino service representative may then offer the special customer one or more services according to their "status" as determined by the casino.

In another example, a portable wireless device carried by the casino service representative may include an audio interface of some type such as an ear-piece inserted in their ear. When the casino service representative is within range of the wireless interface device 264, the representative may hear message in response to gaming information received from the wireless interface 264, such as, "Jane Doe at gaming machine 600 is a special customer and likes drink A." The casino service representative may then respond to the message by asking the player if they would like a drink such as "drink A".

An advantage of using a wireless interface to communicate gaming information, such as a player's status, to a casino service representative, over using a signaling means such as a light on the player tracking unit is that individuals other than casino personnel are less likely to be able to determines the player's status. When anyone can easily discern the signaling means used to indicate the player's status, it may draw undesired attention to the player. For instance, an easily discernable signaling means may increase the special player's chances of becoming a theft target.

Figure 6:
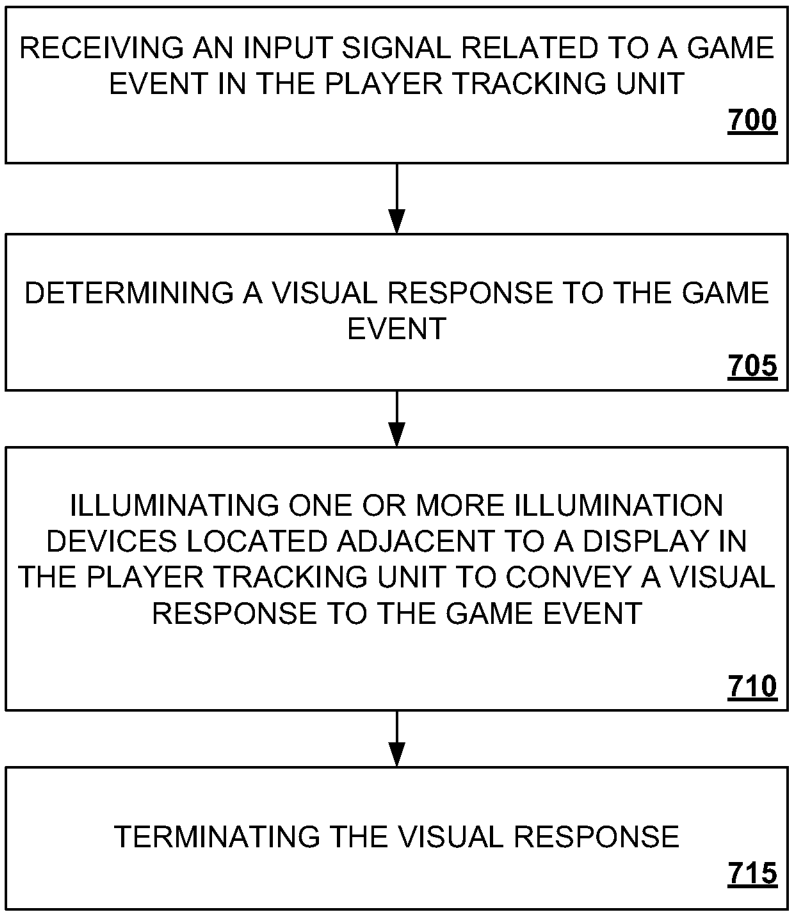
FIG. 6 is a flow chart of a method for visually providing gaming information on a gaming machine.

FIG. 6 is a flow chart of a method for visually providing gaming information on a gaming machine. In 700, an input signal relating to a game event is received by a logic device on the player tracking unit. The input signal may be from but is not limited a gaming machine, a player tracking server, an external device such as a portable wireless device and one or more player tracking interface devices located on the player tracking unit. The input signal may contain gaming information specifying a type of event. For instance, the message the input signal may contain information indicating a player tracking card has been inserted incorrectly. In 705, the player tracking unit may determine a visual and/or aural response to the game event. One response to the game event may be no response. The visual response may be a light pattern to be implemented on one or more illumination devices located on the player tracking unit, such as adjacent to the display. An aural response may be sound or a voice message that will be projected from a sound projection device located on the player tracking unit. A duration of the visual response or aural response may be determined. The visual response and aural response may be repeated for a fixed duration of time. For example, an illumination device may be flashed for 10 seconds or an illumination device may remain illuminated in until an error condition is cleared.

In 710, one or more illumination devices, such as illumination devices adjacent to a display, near a card reader, behind a back-lit key pad and combinations thereof, may be illuminated to convey a visual response to the game event. Also, a sound may be projected from a sound projection device, such as speaker, to convey an aural response to the game event. In 715, in response to a second event, such as the duration of the visual response or aural response ending or an error condition being cleared, the visual response or aural response is terminated. For instance, a player may insert a player tracking card incorrectly and receive a visual response or aural response from the player tracking unit. Then, the player may remove the card and then the visual response or aural response to the incorrectly inserted card may be terminated.

Figure 7:
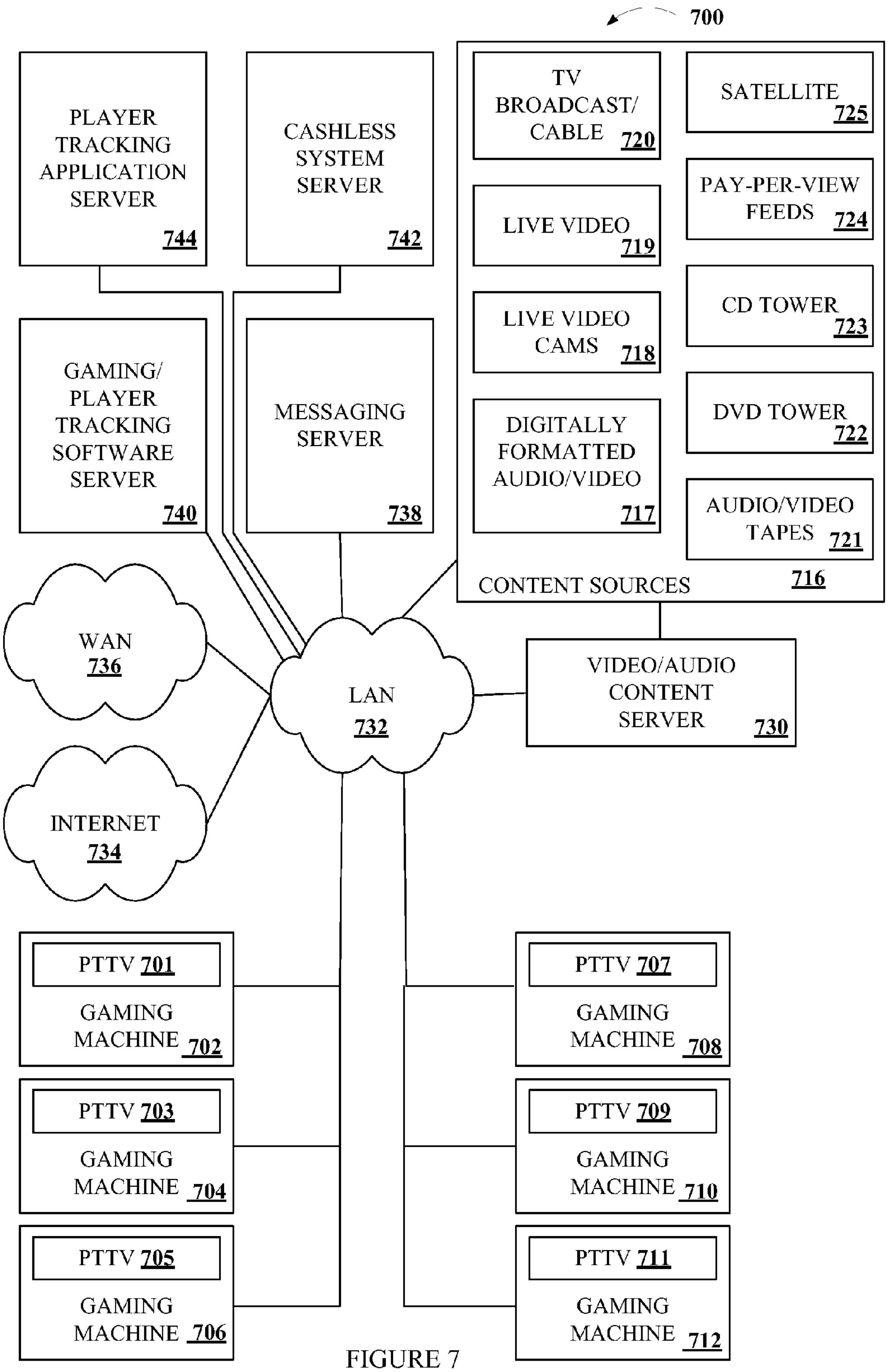
FIG. 7 is a block diagram of a player tracking network of the present invention.

FIG. 7 is a block diagram of a player tracking network of the present invention. The player tracking units, 701, 703, 705, 707, 709 and 711 in gaming machines, 702, 704, 706, 708, 710 and 712, respectively, are capable of displaying multimedia presentations from a number content sources 716. The content sources 716 may include but are not limited to 1) digitally formatted video and audio 717, 2) live video cams, such as feeds from various casino locations, 3) live video 719, such as sporting events and shows offered at the casino, 4) TV and cable programming 720, 5) audio and video programming stored on tapes, 6) movies and music from a DVD tower 722 with a plurality of DVDs, 7) music from a CD tower 723 with a plurality of CDs, 8) Pay-per-view feeds, such as boxing, wrestling or music concerts, and 9) source programming, such as movies and music, delivered via satellite 725. The digital formatted video and audio 717 may include promotions and advertising for display on the player tracking units.

The transfer of files from content sources to the player tracking units may be coordinated from a video/audio content server 730. The video/audio content server 730 may provide "push" services where digital files for display on the player tracking units are regularly downloaded from the server based upon a schedule programmed into and implemented at the server. These files may be stored in memory on the player tracking units and may be played according to a schedule and/or in response to various events at the gaming machine. The schedule and the events used to trigger the playing of the files may also be regularly updated by the video content server 730. The video content server may be used to provide updates of menus used for "content-on-demand" at the player tracking units. Using these menus provided on the player tracking units, a user may be able to select among the various content 716 sources, which may vary with time, such as receiving a live broadcast of an on-going horserace, boxing match, etc., or pre-recorded materials such as movies, comedy shows, music, etc. Live feeds may be delivered to the player tracking units using streaming technologies via a local area network 732. The "content-on-demand" may be considered a "pull" service in that a user may be able to pull content down to the player tracking unit at any time.

Via the LAN 732, the player tracking unit may communicate with a number of remote servers, such as but not limited to 1) a player tracking application server 744 providing player tracking and accounting applications, 2) a cashless system server 742 providing cashless services, such as validating printed ticket vouchers used as an indicia of credit, 3) a gaming/player tracking software server 740 providing downloads of gaming machine software and player tracking software and 4) a messaging server 738 providing location and message communications between two or more player tracking units. The LAN 732 may also be connected to a wide area network 736 and the Internet 734. The player tracking units may be able to communicate with devices connected to the player tracking units over these networks. For instance, a web-browser may be used on the player tracking unit to receive web pages from the Internet 734.

The player tracking units may include a video display and one or more sound projection devices. An interface for selecting among the content sources available at the player tracking unit may be a TV-like interface and programming may be presented in a TV-program listing format, such as having one that displays all available programs that are available for viewing. The TV-like interface may provide features such as but not limited to input mechanisms for 1) changing "channels" and for selecting programs, 2) volume control, 3) customize the display and 4) control the playback of entertainment content. Because the TV interface is universal, it may allow people to familiarize with the unit quicker. Details of the player tracking display and interface are described in more detail with respect to FIG. 8.

The player tracking units may be capable of buffering incoming contents for a jitter free replay. Further, the player tracking units may be capable of storing incoming streams for later viewing (i.e., time-shifting). Also, via the user interface, the player may be able to control playback of programs on the player tracking units, such as fast-forwarding and rewinding programs being viewed. In one embodiment, the player tracking units may be capable these playback features for live events, such as, pausing, rewinding and replaying a play from a live football telecast. This capability may be provided by buffering incoming data into memory on the player tracking unit. Thus, operations, such as rewinding, may be performed by accessing the buffered data in memory. Details of multimedia hardware that may be used to provide these and other capabilities in the player tracking units are described with respect to FIGS. 9 and 10.

The player tracking units may be used in linked gaming applications including cooperative game play and competitive game play where the display on the player tracking unit may be used in conjunction with a main game played on the host gaming machine. In one embodiment, the base game on the host gaming machine may send commands or executable code to the player tracking unit to supplement the features of the base game played on the gaming machine. In another embodiment, a controller connected to a plurality of player tracking units may track and tally gaming information from a plurality of gaming machines in a linked gaming application, such as tournament play, and send commands or executable code to the player tracking units located on the linked gaming machines to support the linked gaming application. For instance, in tournament play, the controller may send status information, such as a leader board, which may be displayed on the player tracking unit.

In another embodiment, the player tracking units may have the ability to cache downloaded software in a mass storage for later release to the host gaming machine. This capability may be useful for when the machine is busy, such as when a game is being played on the host gaming machine. The player tracking unit may be capable of providing software maintenance services for itself and/or the gaming machine. For instance, the player tracking unit may be able to determine the status of software on its host gaming machine, connect with a remote server, such as 740, determine whether any upgrades or software fixes are needed for software installed on the gaming machine, and download software from the remote server and then transfer it to the gaming machine.

In one embodiment, the player tracking units may be used as thin clients with a browser to play games served by a game server. In this embodiment, the games may be implemented using platform independent code, such as JAVA. The JAVA code may be downloaded from the remote server and played using on the player tracking unit using browser software. Details of these and other applications are described with respect to FIG. 11.

The player tracking units may implement auto-provisioning allowing the devices to self-register to a server such as the IGT Floor Control Server (FCS). The automatic provisioning capability allows a casino to shuffle machines around, add new ones, remove old ones, easily without paper work and (human) data-entry error with the current manual process. Tracking where the machines are and tracking what is their current configuration may also help managing these capital assets according to regulation requirements. This login-and-setup procedure may include registration with the Dynamic Host Configuration Protocol (DHCP) Server, the Network Time Protocol (NTP) server, the File Transfer Protocol (FTP) server, and the FCS server. Details of auto-provisioning methods are described in more detail with respect to FIGS. 12 and 13.

Figure 8:
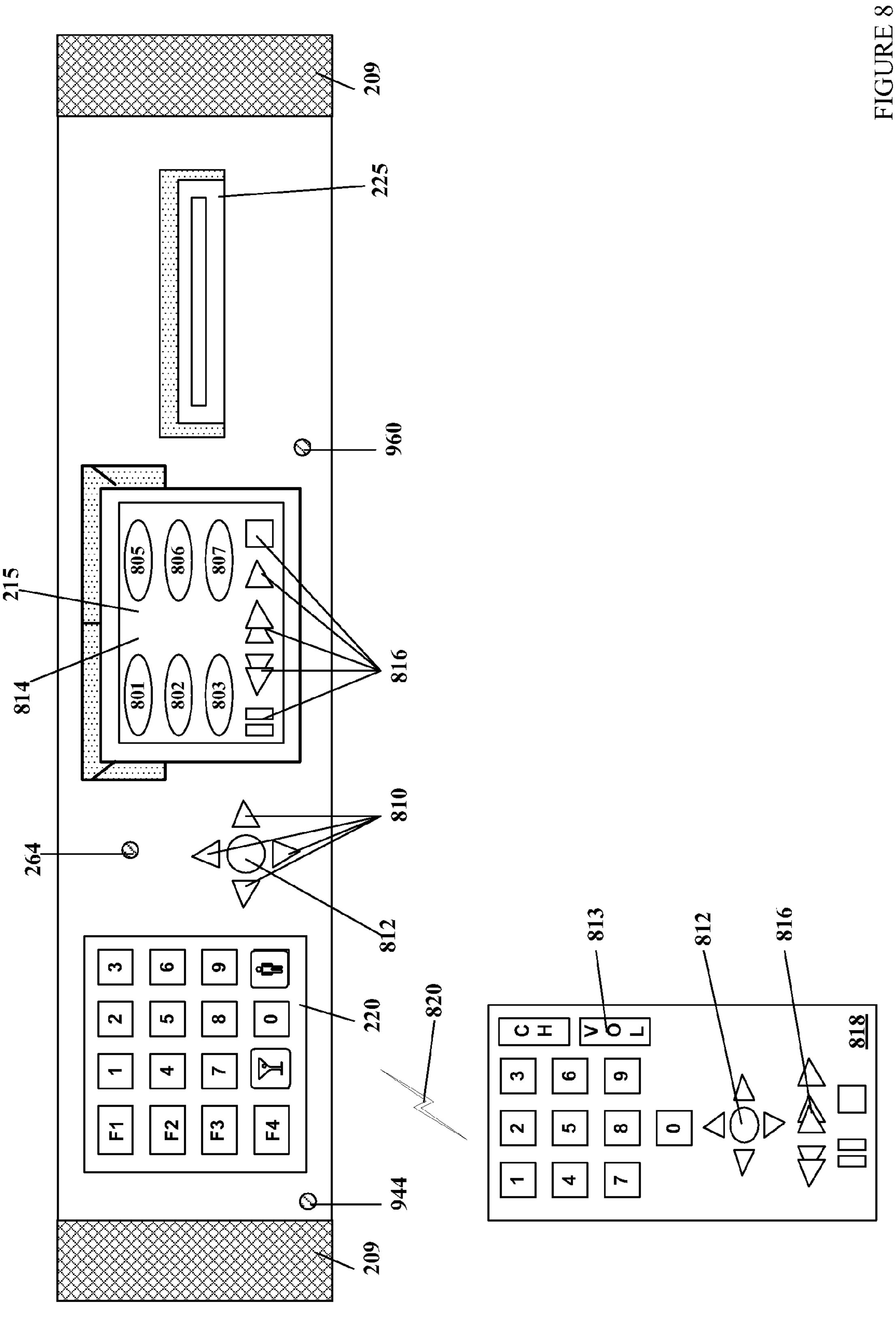
FIG. 8 is a block diagram of a player tracking user interface of the present invention.

FIG. 8 is a block diagram of a user interface for one embodiment of a player tracking unit 200 of the present invention. The display 215 may be from 3 inches to 15 inches in diameter. In one embodiment, the display may be used to display a number of menu items, 801, 802, 803, 805, 806 and 807. The menu items may represent entertainment content sources that may be displayed on the player tracking unit, such as menu items for video on demand or the menu items may represent a table of contents, such as different entertainment content categories, that may lead to detailed menus for each category selected. Therefore, with the present invention, menus may be nested in different layers. Details of other types of menu interfaces that may be used with the present invention are described in co-pending U.S. application Ser. No. 09/961,051, filed on Sep. 20, 2001, and entitled "Game Service Interfaces For Player Tracking Touch Screen Display," which is incorporated herein in its entirety and for all purposes.

The menu items may be selected using a number of different input mechanisms. In one embodiment, the display 215 may include a touch screen 814 that may be used to detect a selection of a menu item. In another embodiment, the menu items may be selected using input buttons 810 and enter button 812. In yet another embodiment, the key pad 220 may be used to menu items or change channels on the display.

A "TV-like" remote 818 may be used to operate the player tracking unit like a television. The remote 818 may communicate with the player tracking unit via the wireless interface 264 using wireless communications 820. In one embodiment, the remote 818 may be a hand-held unit. In another embodiment, the remote 818 attached or mounted to the gaming machine in some manner. For instance, the remote 818 may be attached to player tracking unit via cable or the remote 818 may be integrated into the gaming machine or a chair attached to the gaming machine.

Once a program is selected, a video portion of the program may be presented on the display 215 and an audio portion of the program may be projected through the speakers 209 or a user may be able to listen to the audio portion of the program via headphones connected to a headphone jack 944. The user may be control playback of the selected program using one or more of 1) control buttons 816 on the touch screen 814, 2) input buttons 810, 812 and 220 on the player tracking unit and 3) input buttons on 812, 813 and 816 on the remote control. The playback control of a program may include but not limited to pause, forward, rewind, play, stop, slow motion, search, mute, volume control and display controls. The interface devices used to input a program selection, output a selected program and control playback features of the program on the player tracking unit may be considered a multimedia interface for the player tracking unit.

The player tracking unit may include a proximity sensor 960 (also described with respect to FIG. 2C) to detect whether a player is in front of the gaming machine. In one embodiment, the proximity sensor may use an Infrared (IR) sensor, which periodically emits a particular pulse and examine reflected waves. The information from the IR sensor, such as when a player is near the gaming machine may be used to determine when an "attract" program on the player tracking unit is played.

In one embodiment, the player tracking unit 200 may play music that a user has selected from a music jukebox (audio and/or video), as well as play music that customers have pre-recorded on their memory sticks, flash memory cards, MP-3, player, etc. Therefore, the player tracking unit may include an input interface allowing a user to down download digitally formatted video and audio files into the unit. The digital formatted video and audio files may be processed by a multimedia board on the player tracking unit which is described in detail with respect to FIG. 9.

Figure 9:
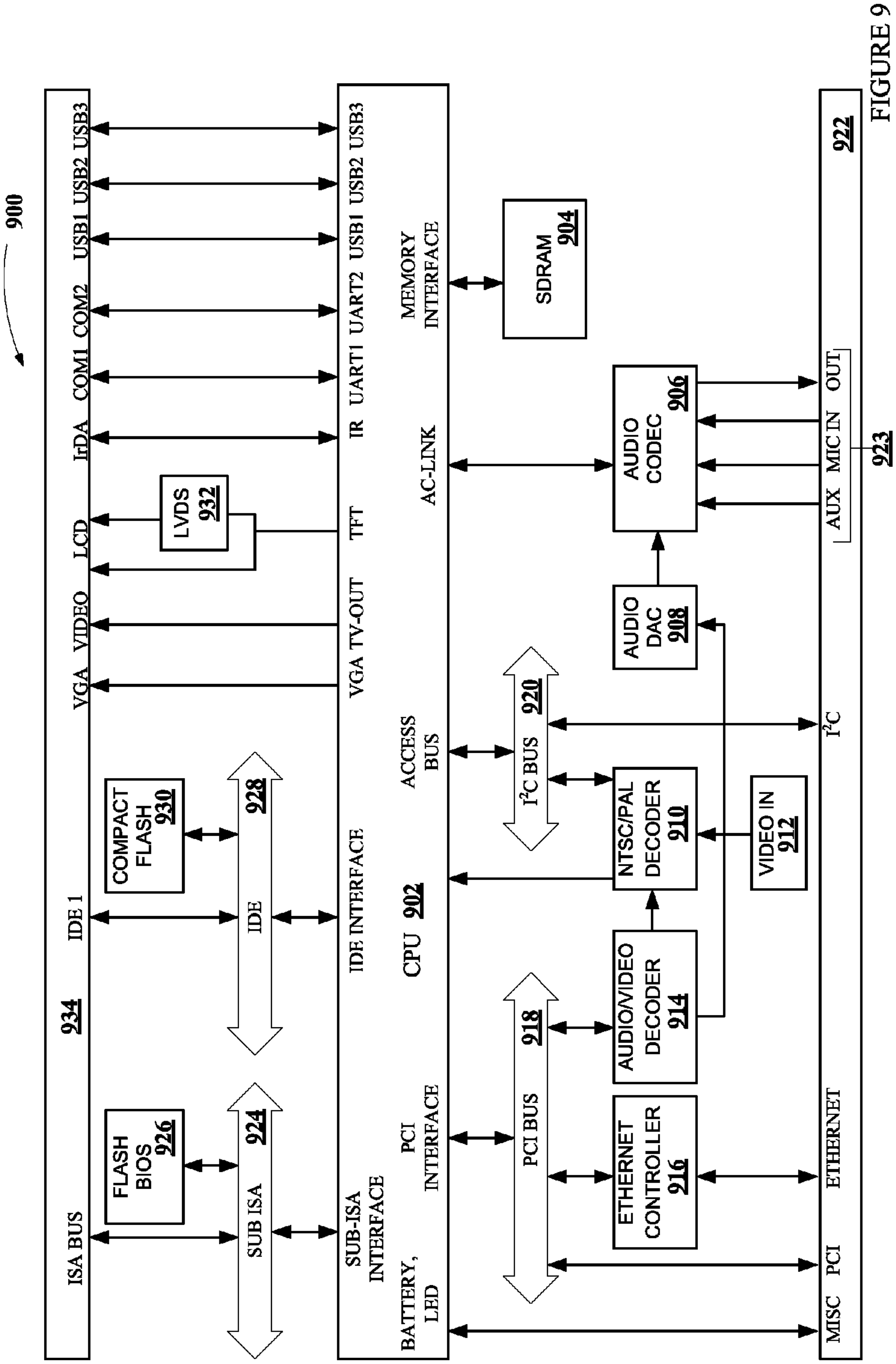
FIG. 9 is a block diagram of a multimedia board for a player tracking unit of the present invention.

FIG. 9 is a block diagram of a multimedia board 900 for a player tracking unit of the present invention. The present invention is not limited to the multimedia board, which is presented for illustrative purposes only. The CPU 902 may be an x86 compatible system on a chip. The chip may also include MMX support, a CRT, a TFT video processor, an NTSC/PAL TV encoder, core logic, a Video Port (VIP) and a Super I/O block. MMX are multimedia instructions that have been built into some brands of micro-processors.

For memory, the board 900 may employ a 256 KB BIOS FPROM 926 and a compact flash header 930 for mass storage. The compact flash header 930 may be used with a mass storage device to store digitally formatted audio content and video content that may be played using the multimedia board 900, such as attract features. The compact flash memory may communicate with the CPU 902 via an IDE interface 928. An IDE channel (IDE 1) connected to the IDE interface 928 may provide communication with two external IDE compatible devices, such as CD/DVD-RW drives or a hard drive. A mass storage device connected via the IDE 1 port and the compact flash memory 930 may be used 1) to store player tracking software, 2) as a cache (temporary storage) for gaming machine software and other gaming information that may be downloaded from a game server and 3) to store additional audio content and video content that may be played by the multimedia board 900, such as digitally formatted audio and video files. The software downloaded from the game server may be for the player tracking unit or the gaming machine.

The multimedia board 900 may provide a number of video display functions. For instance, the board 900 may include a hardware video accelerator 910 for scaling, filtering and color space conversion. The board 900 may support a number of video interfaces, such as but not limited to, 1) a CRT-Interface (VGA), 2) a TFT-Interface, and 3) a TV-Interface (TV-Out). The TFT interface may support an LVDS (low-voltage differential signal) output 932 via the LCD port.

The board 900 may include an audio/video decoder 914 to support streaming video applications and to support fast decoding of digitally encoded video files and audio files. A video and/or audio decoder are designed to recognize a digital bit stream encoded in a particular format. Music and video files may be encoded in a number of digital file formats as specified according to a standard. The standard defines a bit stream syntax and the decoder semantics. To be compliant with a particular standard, such as a digital video standard, the decoder implementation needs to correctly interpret the meaning of bits and render the associated image. To increase processing speed, logic for a video decoder or audio decoder may be integrated directly into hardware. For instance, the audio/video decoder 914 and the NTSC/PAL decoder 910 are examples of audio/video decoders integrated into the hardware. In the present invention, the logic for video and audio decoders may also be implemented in software.

Features of the audio/video decoder 914 may include DVD/MPEG-2 decoding and playback, AC-3 decoder, S/PDIF encoder, and a Macrovision protected TV encoder. The decoder 914 may be used with physical formats including but not limited to, DVD, DVD Audio, SVCD, VCD 1.x/2.0, CD-DA. The decoder 914 may be used with video decoding standards including but not limited to MPEG-1, MPEG-2, MPEG-3 and MPEG-4. The decoder 914 may work with video formats such as but not limited to CCIR 601, CCIR 656, NTSC and PAL. The decoder 914 may provide for modification of video features including but not limited to brightness, color, contrast, gamma controls.

For streaming applications, digitally formatted video and audio files may be sent directly to the decoder 914 via the Ethernet controller 916 and the PCI bus 918. The Ethernet interface, including controller 916 and the Ethernet connector, may support, 10BASE-T and 100BASE-TX Ethernet protocols, respectively. Via the Ethernet interface, the player tracking unit may communicate with remote servers, remote player tracking units, remote gaming machines and other devices connected via the LAN 732 as described with respect to FIG. 7. In some embodiments, the player tracking unit may also communicate with a host gaming machine for the player tracking unit via the Ethernet interface. The board 900 may include one or more Ethernet ports to allow for Ethernet communications.

To allow for jitter free replay and for playback features, such as pause, fast forward, rewind and different playback speeds, digital video/audio files may also be buffered and/or stored in a memory device on or connected to the multimedia board 900. For instance, the compact flash memory 930 or a mass storage device connected via the IDE 1 port may be used to store and buffer digitally formatted video and audio files. In this instance, the digital bit stream may be sent via the IDE bus 928 to the PCI bus 918 for processing by the audio/video decoder 914.

The NTSC/PAL decoder 910 is a video capture device for applications at the image port of the VGA controller. The decoder 910 may accept decoded signals from audio/video decoder 914 and analog signal from a TV or VCR source via the video-in 912. In one embodiment, the multimedia board 900 may include or may be connected to a TV tuner (not shown) and/or an FM/AM radio tuner (not shown). Signals from the TV tuner may be processed by the NTSC/PAL decoder 910. Signals from the FM/AM radio tuner may be processed by the audio Codec (code and decode) 906.

The NTSC/PAL 910 decoder may be based on line-locked clock decoding and may be able to decode the PAL, SECAM and NTSC color signals into ITU 601 compatible color component values. It may accept analog inputs as CVBS from TV or VCR sources. Weak and distorted signals may be processed, too. An expansion port (X-port) for digital video (bi-directional half duplex, D1 compatible) may be available to connect to the audio video decoder 914 or to a videophone Codec. At the image port (1-port) 8 or 16-bit wide output data with auxiliary reference data for interfacing to VGA controllers are supported. One application for the decoder 910 may be to capture and scale video images, which are provided as digital video stream through the image port of a VGA controller, for display via VGA's frame buffer, or for capture to system memory.

The multimedia board 900 may include an audio Codec 906 (code and decode) for processing audio signals received via an audio port 923 (aux, microphone, in and out in connector 922) and via the digital to analog converter 908 which is connected to the audio/video decoder 914. The audio port 923 may have the following features: 1) AC97/AMC97 Rev2 compliant, 2) 3D Sound circuitry, 3) high quality sample Rate conversion (SRC) from 4 kHz to 48 kHz in 1 Hz increments, AUX in L/R (for CD/DVD), line out L/R. The audio Codec 906 may output signals via the audio port 923 to a sound projection device, such as speakers located on the player tracking unit, speakers located on the gaming machine or a headphone interface. The audio Codec 906 (see FIG. 10) may process signals input from a microphone connected to the player tracking unit, such as for voice recognition applications, as described with respect to FIGS. 2A, 2C and 3. Further, the audio Codec 906 may process audio signals input from an external device, such as an MP3 player or a memory stick that may be connected to the player tracking unit via an input interface on the player tracking unit.

The PCI bus interface in CPU 902 in communication with the PCI bus 918 may have, as an example, the following characteristics: 1) wake-up capability, 2) 32-bit data path, up to 33 MHz, 3) fixed priority and 4) 3.3V signal support. The PCI bus may be accessed via the external PCI connector on connector 922. The PCI bus 918 or a graphics interface (not shown) may allow a video graphics card to be connected to the motherboard for additional graphics processing power. The video graphics card may include additional memory and a co-processor for performing graphical operations.

The Sub-ISA bus interface in CPU 902 in communication with the sub-ISA bus 925, as an example, may have the following characteristics: 1) 16 MB addressing, 2) support for up to two chip selects for external I/O devices, 3) 8-bit (optional 16-bit) data bus width. The sub-ISA bus 924 is externally accessible via the ISA bus connector in connector 934. A flash bios 926 for the multimedia board may be connected to the sub-ISA bus 925. The flash bios may store information, such as but not limited to 1) identification of devices on the multimedia board, 2) identification information for the board 900 which may be used to register the player tracking device with one or more external servers, 3) boot instructions, 4) download software instructions, 5) authentication instructions and data (e.g., encryption key), 6) device drivers and 7) configuration information.

The $I^2C$ bus 920 connected to the access bus in CPU 902 may be accessible via two $I^2C$ ports in connector 922. The two $I^2C$ bus interface ports are configurable either as a bus master or slave. They can maintain bi-directional communication with both multiple master and slave devices.

Three independent USB ports may be available on the board 900. These ports are externally accessible via the USB1, USB2 and USB3 ports in connector 934. Different boards may provide additional USB ports. Also, USB expansion ports may be connected to one or more of the USB ports. The present invention is not limited to a USB compatible connectors and protocols. For instance, IEEE1394 compatible connectors/protocols and FireWire compatible connectors/protocols may also be used. Details of using standard peripheral communication connections that may be used with the present invention are described in U.S. Pat. No. 6,251,014, issued Jun. 26, 2001, by Stockdale, et al., entitled, "Standard Peripheral Communication," previously incorporated herein.

The three USB ports may be open host controller interface 1.0 (OpenHCI) compliant. The OpenHCI specification provides a register-level description for a host controller, as well as common industry hardware/software interface and drivers. The multimedia board includes external connections in connector 934 for two serial communication ports (COM1 and COM2). The two serial ports are connected to the UART1 (Universal Asynchronous Receiver/Transmitter) and UART2 in CPU 902 respectively. The serial communication ports may be 16550A compatible. External drivers may be necessary to convert the signals for interfaces like RS232, RS485 or RS422. The USB and COM serial ports may be used to connect to devices such as a card reader, bar-coder reader, RFID reader, a smart card reader, a key pad and a master gaming controller on a gaming machine.

The multimedia board includes a wireless interface, shown as IrDA on connector 934, that allows for wireless communications with various devices, such as the remote control device 818 in FIG. 8. In one embodiment, the wireless interface may be an Infrared (IR) port. The IR port may be IrDA compatible, support Sharp-IR options ASK-IR and DASK-IR, support Consumer Remote Control supports RC-5, RC-6, NEC, RCA and RECS80.

The IR port may be used as an additional serial port for wireless communications. The communication may be with a device such as with a hand-held personal digital assistant (PDA). The port may support various communications rates depending on the data standard that is used. For instance, a data rate of up to 115.2 Kbps with HP-SIR, a data rate of 1.152 Mbps with MIR and a data rate of 4.0 Mbps with FIR, may be obtained.

The CPU 902 may include a real-time clock. The clock may include features such as 1) DS1287, MC146818 and PC87911 compatibility, 2) a multi-century calendar and 3) a battery back up. The CPU 902 may include logic for power management called a core logic module. The core logic module may be ACPI 1.0 (Advanced Control and Power Interface) compliant. The module may offer the following features: 1) automated CPU Suspend modulation, I/O Traps and Idle Timers for peripheral power management, 3) software SMI and Stop Clock for APM support and ACPI-compliant timer and register set. The power supply for the board 900 may be 5 VDC and other voltage may be generated on board.

The CPU 902 may execute an operating system that is used to load player tracking software modules into SDRAM 904 for execution by the CPU 902. Via the Ethernet interface, software upgrades for both the player tracking unit and also the host gaming machine may be downloaded to the player tracking unit. The player tracking software may use a modular software architecture with well defined API's. Details of the player tracking software architecture are described with respect to FIG. 11.

Figure 10:
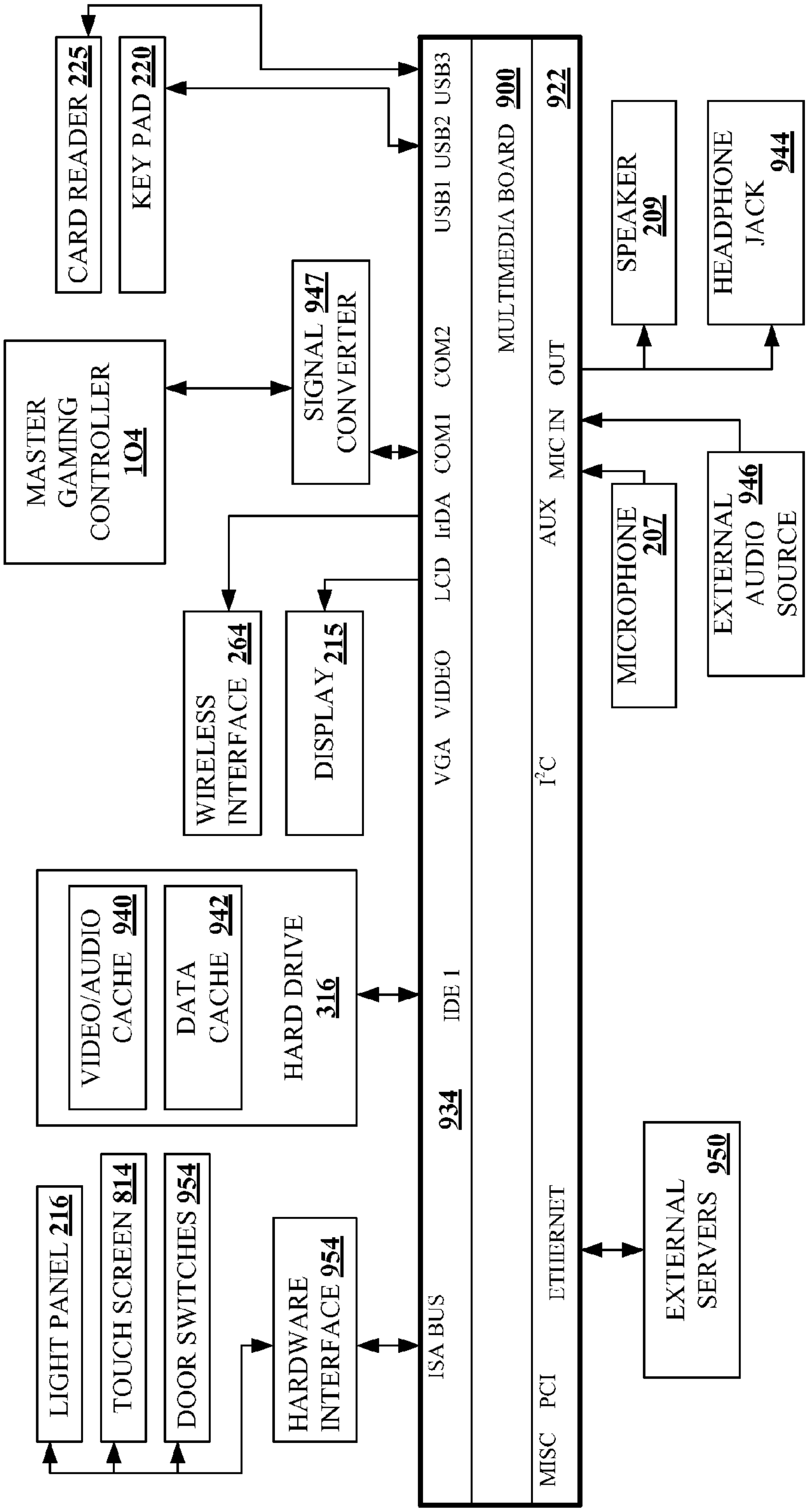
FIG. 10 is a block diagram of components of a player tracking unit of the present invention.

FIG. 10 is a block diagram of components of a player tracking unit of the present invention integrated with a multimedia board 900 described with respect to FIG. 9. The connection scheme and the number and type of devices are for illustrative purpose only. Different combinations of devices may be configured with player tracking devices of the present invention and is not limited to the combination in FIG. 10. For instance, in some player tracking units, the card reader 225 may be replaced with a bar-code reader or a bar-code reader may be included in addition to the card reader 225. Further, different connection schemes may be employed. For instance, the touch screen 814 is shown connected via the ISA bus connector in connector 934. The other embodiments, the touch screen 814 may be connected via the PCI bus interface, one of the USB ports or one of the communication ports (COM1 or COM2).

In FIG. 10, a custom hardware interface 954 is used to connect door switches 954, a touch screen 814 and light panel 216 to the board 900 via the ISA BUS. A mass storage device 316 is connected to the board 900 via the IDE connector. The mass storage device 316, which in this example is a read-write capable hard-drive, may be used as a video/audio cache 940 and a data cache 942. As described with respect to FIG. 9, the board 900 may also include compact flash memory that may also be used as a video cache and a data cache.

The display device 215 in this example is an LCD and is connected via the LCD port. The present invention may employ a variety of displays, which may require connections through a different port, such as the VGA port. The size of the display may be varied with the present invention. Displays that range from 4" diameter to a 15" diameter may be used.

A wireless interface 264 is connected to the IrDA port. The wireless interface may allow communication with a wireless device such as a TV style remote 818 for controlling audio and video features on the player tracking unit (see FIG. 8) or a portable wireless device, such as a player wireless interface 602, a host wireless interface 604 or a service wireless interface 606 as described with respect to FIG. 6. As described with respect to FIG. 9, the IrDA port may support a number of infrared standards and is not limited to IrDA.

The player tracking controller on the multimedia board (hardware and software used to control the functions of the player tracking unit) may communicate with the master gaming controller on the host gaming machine via the communication port, COM1. In other embodiments, the player tracking unit may communicate with the master gaming controller via a USB or Ethernet connection. Typically, a player tracking unit is integrated into the host gaming machine. A signal converter 947 may be used to convert serial signals from the multimedia board to a physical format accepted by the gaming machine, such as RS-232. The physical signal formats used by different gaming machines may vary from manufacturer to manufacture and between different models of the same manufacturer.

The card reader 225 and the key pad 220 are connected to the board via the two USB ports, USB2 and USB3. The microphone 207 is connected to the microphone input port, MIC. An external audio source 946, such as a portable music player, is connected to the player tracking unit via the line in port. One or more sound projection devices located on the player tracking unit, such as speaker 209 and/or the host gaming machine receive audio signals from the line out port on the board 900. The line out port may also be used to provide a signal to a headphone jack 944 located on the player tracking unit. Via the headphone jack, a user of the player tracking unit may receive audio output via headphones that may be connected to the unit.

The Ethernet port may be used to connect the player tracking unit to a local area network. The player tracking unit may communicate with devices connected to the local area network, such as the external servers 950. The external servers 950 may include but are not limited to a player tracking/accounting server, a cashless system server and remote servers providing entertainment content. The player tracking unit may also be able to communicate with other devices connected to the local area network via the Ethernet port, such as, but not limited to other player tracking units, other gaming machines and data collection units (DCUs) (see FIG. 1).

Figure 11:
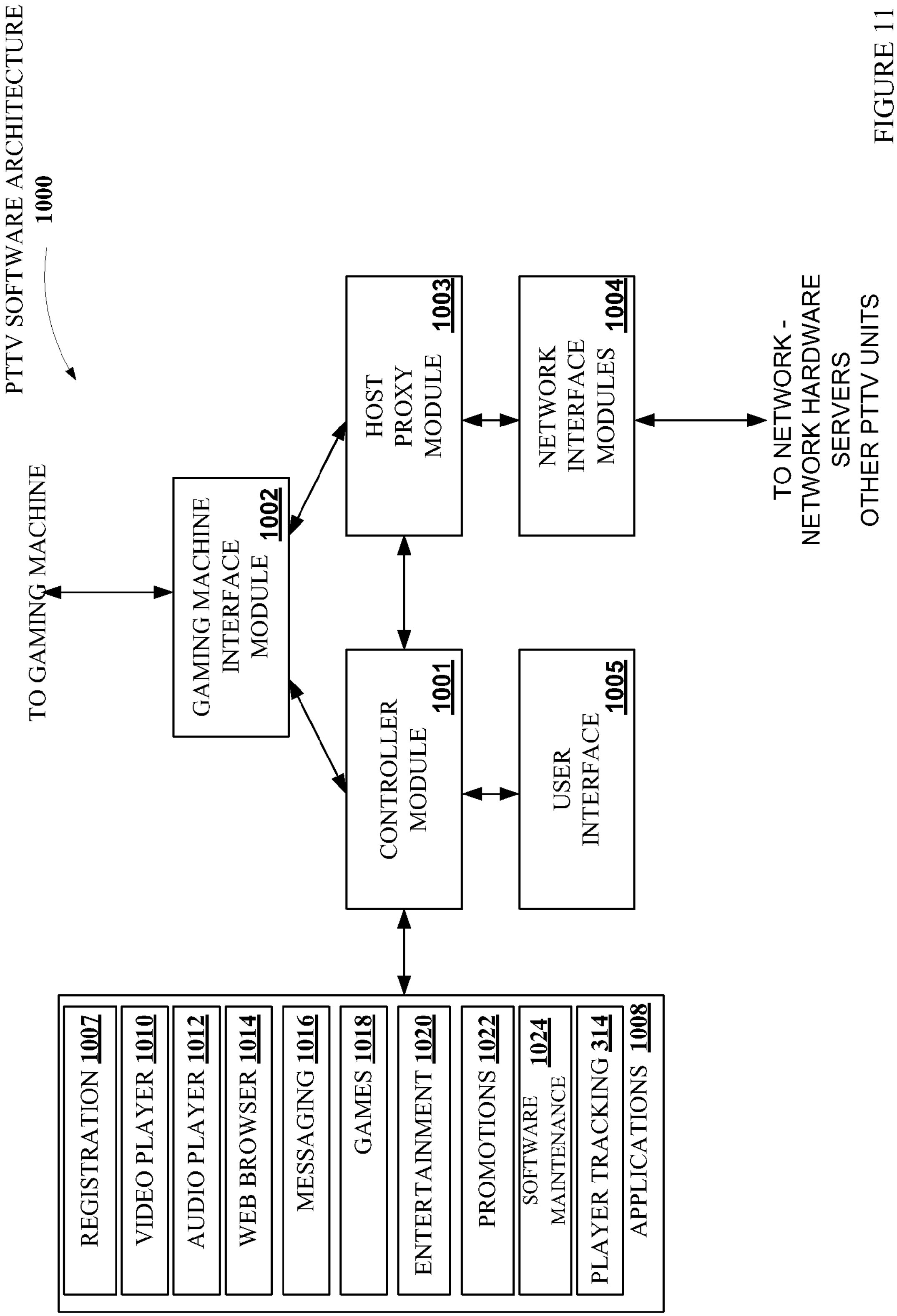
FIG. 11 is a block diagram of a software architecture for a player tracking unit of the present invention.

FIG. 11 is a block diagram of a software architecture 1000 for a player tracking unit of the present invention. The player tracking software is configured in a modular manner. The modular architecture may allow different components of the player tracking software to be upgraded and bugs to be fixed by replacing only affected components via a download from a remote server. In addition, the supported features in the player tracking unit may be upgraded by downloading new application software 1008 or upgrading existing application software on the unit.

The functions of the player tracking unit may be controlled by the controller module 1001. The controller module 1001 may utilize an operating system to schedule and prioritize tasks executed by the multimedia board including loading software into RAM for execution. The applications 1008 are examples of playing tracking software that may be loaded into RAM for execution by the controller module 1001. The controller module 1001 may send information to the other software modules, such as a gaming machine interface module 1002, a host proxy module 1003, a user interface 1005 and the various applications 1008 and receive information from these software modules. The different software modules may communicate with the controller module 1001 and each other via well-defined application program interfaces (APIs).

The gaming machine interface module 1002 may include logic for communicating with gaming machines using different proprietary communication protocols and non-proprietary communication protocols as was described with respect to FIG. 3. The gaming machine interface module 1002 may be used to send data to the host gaming machine and receive data from the host gaming machine. The data received from the gaming machine may include gaming information, such as, gaming machine identification information, gaming machine software information, gaming machine status information and metering information on the gaming machine. The player tracking unit may be able to download software to the gaming machine via the gaming machine interface module 1002.

The host proxy module 1003 may be used to manage communications between the player tracking unit and gaming devices that may communicate with the player tracking unit via local area network. The gaming devices may include but are not limited to remote servers, other player tracking units, remote gaming machines and data collection units. The communications with different devices may be enabled by a plurality of network interface modules 1004. The network interface modules may allow the player tracking unit to communicate using communication protocols required by different gaming devices. For instance, player tracking/accounting servers from different manufacturers may use different communication protocols as described with respect to FIG. 3.

The controller module 1001 may execute a number of player tracking applications 1008. A number of player tracking applications 314 have been described with respect to FIGS. 1-6. In other embodiments, the controller module 1001 may include logic for automatically registering and deregistering the player tracking unit and/or the host gaming machine with one or more remote servers, such as a player tracking accounting server. Before the player tracking unit beginning communications with a remote server, the remote server typically requires information used to recognize player tracking unit and the host gaming machine. Traditionally, information needed by a remote server to recognize a particular gaming machine has been entered into the remote server in a manual process. For instance, at the gaming machine, a first technician may obtain and write down on a piece of paper the required information needed by the remote server to recognize the gaming machine and give the information to a second technician. After receiving the information, the second technician may manually enter, such as via a keyboard, the information on the paper into the remote server. If the second technician has correctly entered the information, then when the gaming machine is powered-up, communications may be established between the gaming machine and the remote server via the player tracking unit. In present invention, the registration logic 1007 executed by the controller module 1001 may be used to automatically transfer the information required for registration to one or more remote servers. Details of the registration and deregistration method are described with respect to FIGS. 12 and 13.

In another embodiment, the controller module 1001 may execute one or more software applications allowing the player tracking unit to perform software maintenance. The software maintenance application 1024 may allow the controller module 1001 to determine versions software of currently in-use on the player tracking unit, login into a remote server and compare the versions of software with software versions available on the remote server and determine when an upgrade is needed. The software may be upgraded to fix errors and/or to add new features. When the controller module has determined an upgrade is needed the player tracking unit may be capable of downloading one or more software modules and automatically installing the software on the player tracking unit. The software maintenance may be triggered in response to many factors, such as but not limited to 1) in response to a time factor monitored by the player unit, such as checking for upgrades once a month or once a week, 2) in response to a command received from a remote server or 3) in response to an input received at the player tracking unit. The input received at the player tracking unit may be generated by an operator.

In another embodiment, the player tracking unit may not only perform software maintenance for the player tracking unit but also for the host gaming machine. Thus, the player tracking unit may survey software that is being used on the host gaming machine, compare the software being used on the gaming machine with software available on a remote server and download software for installation on the gaming machine. The player tracking unit may store the downloaded software to a mass storage device, such as a hard drive. Thus, the hard drive may serve as a temporary cache for gaming machine software.

The player tracking unit may notify the gaming machine that it is has downloaded the software that is available for installation on the gaming machine and the reason for the upgrade. The gaming machine may notify the player tracking unit when it is ready to receive the software. When the player tracking unit receives the software request from the gaming machine, the player tracking unit may download the software to the gaming machine. When the player tracking unit or the gaming machine has successfully received and/or installed new software, they may notify the remote server that sent the software of the successful reception and/or installation of the software. An advantage of using the player tracking unit as a temporary cache for gaming machine software is that it may prevent performance degradation of the gaming machine resulting from large data transfers.

In other embodiments, the controller module 1001 may control a number of applications that utilize the multimedia capabilities of the player tracking unit. The entertainment application 1020 may be used to generate menus of available entertainment selections that are available for presentation on the player tracking unit. The entertainment selections may include but are not limited to live broadcast events (e.g., sporting events, boxing, horse racing, news), time-shifted programs, video-on-demand (e.g., movies and pay-per-view), TV/Cable programming, live video cams (e.g., a video feed of the casino floor, the Las Vegas strip, a show being performed at the casino, etc.) and audio selections (e.g., a music jukebox).

The entertainment selections available for viewing may change with time. For instance, the controller module 1001 may receive regular updates of available entertainment selections from one or more remote servers via the network interface modules 1004 and the host proxy module 1003 and may update the menus that may be displayed on the unit. In one embodiment, a player may be able to customize their video and audio selection menus. For example, the player may be able to select favorite sports teams, favorite TV shows, favorite music selections or favorite music categories. When a player registers at the player tracking unit (inputs identification information, the entertainment preference information for an individual player may be retrieved by the controller module 1001 from a remote server and used to generate custom entertainment selection menus for the player.

The controller module 1001 may control output entertainment menus using the user interface software 1005. Via the user interface software 1005, which may include logic for defining the hardware-software interface and logic for controlling various hardware devices, the controller module 1001 may be able to display the menus to a display on the player tracking unit and receive entertainment selections via one or more internal or external input devices, such as a touch screen or a hand-held remote as described with respect to FIG. 8.

When the player tracking unit has received an input requesting an entertainment selection, the controller module may launch an second application that allows the entertainment selection to presented on the user interface, such as but not limited to a video player 1010, an audio player 1012 and a web-browser 1014. These applications may accept inputs from the user interface that are used to operate features of the application. For example, during playback, the video player may accept inputs for playing, forwarding, rewinding, pausing, stopping, increasing/decreasing the volume and slow motion of a video feature being played by the video player. The inputs may be generated from a remote input device, such a remote control or a local input device, such as input buttons on the player tracking unit or a touch screen on the display of the player tracking unit.

In yet another embodiment, the controller module 1001 may control promotion software 1022 that presents various promotional features on the user interface of the player tracking unit. The promotional features may utilize the multimedia capabilities of the player tracking unit, such as video and audio presentations via the user interface on the player tracking unit. The promotional features may include 1) attraction presentations to attract a player to the gaming machine, 2) advertising for various casino services, 3) promotional awards, such as a bonus award on a gaming machine, promotional credits for game play, and coupons for casino services, such as discounted or free food and entertainment.

The promotional activities presented on the player tracking unit may be selected based upon game play activity on the gaming machine. For instance, certain promotions may be offered to a player based on how long they have been playing on a particular machine, how much they have wagered and how much they have won. Further, the promotional activities may be selected for a particular user using demographic information obtained from the user, such as information input using a player tracking card.

The promotion and attraction presentations and a schedule for promotions/attraction may be regularly updated via downloads from a remote server. The promotion and attraction presentations may be updated to reflect different events throughout the year. For instance, during holiday periods, the graphics and sound used in the video and audio portions of advertising, attraction features or promotions presented on the player tracking unit may reflect holiday themes or seasonal themes, such as but not limited to leprechauns and clovers with Irish music around St. Patrick's day, patriotic symbols and music around 4th of July and Halloween symbols and music around Halloween.

In another embodiment, advertising, promotions and attraction features may be based upon player identification information for a player at the gaming machine. For example, a player may be offered a special promotion or a special attraction feature may be played for the player on the day of their birthday or around the time of their birthday. As another example, special promotions or special attraction features may be played for players that are considered highly valuable to the casino. As another example, if a picture is available of the player, the picture may be integrated into an attract feature tailored to the player. The player identification information may be obtained from the player via a loyalty program, such as player tracking club. When the player initiates a player tracking session on the gaming machine, identification information about the player can be obtained and used to tailor specific promotions and attract features to the player at the gaming machine.

In another embodiment, a number of different gaming activities may be enabled via gaming software executed on the gaming machine. These gaming activities include but are not limited to: 1) a game of chance played on the player tracking unit, 2) a sports book for wagering on sporting events that may be viewed with the player tracking unit, 3) bonus games, 4) progressive games and 5) linked games including cooperative games and tournament games. The gaming applications on the player tracking may be independent of the gaming activity played on the host gaming machine or linked to the gaming activities on gaming machine. For instance, a bonus game played on the gaming machine may be triggered as a result of gaming events on the gaming machine, such as but not limited, an amount of money wagered on the gaming machine in a game play session or a bonus game may be triggered independently of game activity, such as at random.

The player tracking unit may be used to support linked game applications. For instance, during a tournament, a user may be able to view a status board for the participants playing in the tournament, such as leader board via the player tracking display or hear status information for the tournament. In a cooperative game, the user may be able to view or hear status information for the cooperative game via the player tracking interface. In one embodiment, in a cooperative game, a group of player's on different gaming machines may try to gather a number of items in a treasure hunt via game play on each of their respective host gaming machines. The progress of the group of player's, such as the number of items found for the group and items needed by the group may be displayed on the player tracking unit.

Peer-to-peer communication between different player tracking units may allow different groups of player tracking units to be linked and unlinked for cooperative or competitive game play. For instance, a user on one gaming machine may send out a message to a group of other gaming machines asking whether anyone wishes to join in a competitive or cooperative game or messages for cooperative or competitive linked games may be sent out regularly from a remote server. Once a group of player's has elected to join in a linked game, their gaming machines may be linked together via peer-to-peer communications between the player tracking units on the gaming machines. After the linked game is over, the player tracking units gaming machines may end the link allowing for different groups to form and break-up over time.

In another embodiment, the controller module 1001 may execute messaging software 1016 that allows messages to be sent from one player tracking unit to another player tracking unit. The messaging software may allow a user at a first gaming machine to request communications with another user at a second gaming machine via the player tracking units on each of the gaming machines. After, the messaging software 1016 may be able to determine whether the requested user is currently registered with another gaming machine on the player tracking network via the gaming machine's player tracking unit. For instance, in one embodiment, the messaging software may contact a remote server or router that tracks user activity on different gaming machines and can match a user to a particular player tracking unit. In another embodiment, the messaging software 1016 may broadcast a message to the other player tracking units connected to a local area network requesting communications with the requested user that may be registered at one of the player tracking units on the network.

When the requested user is located at a second player tracking unit, the first player tracking unit requesting the communications may establish a peer-to-peer communication link with the second player tracking unit. Then, the users at the two player tracking units may communicate with one another directly. The messages may be in different formats such as text, voice, video and combinations thereof. The text, voice and video formats may utilize the multimedia capabilities of the player tracking unit including the multimedia board, display, microphone, sound projection devices and input devices. At the end of the communication session, the peer-to-peer link is terminated between the player tracking units. In the present invention, peer-to-peer message communications is not limited to communications between two player tracking units. Peer-to-peer message communications may be generated three or more player tracking units to allow "conference" type communications between different groups of player tracking units.

Peer-to-peer communications may also be used to allow groups of player tracking units to simultaneously present common multimedia functions. For instance, two or more players may wish to watch the same "sporting event" and send messages to each other about the game while they are playing the gaming machine. Using the peer-to-peer link on the player tracking unit, the communication link and the simultaneous broadcast of the sporting events may be coordinated between the player tracking units. In another embodiment, two or more players may desire to listen to the same music while they are playing the gaming machine and even trade musical selections. Using the peer-to-peer communication link, two or more player tracking units may be able to share musical (including music videos) and video selections for play on one or both of the player tracking units.

In yet another embodiment, peer-to-peer communications may be used to share contents between other player tracking units and gaming machines in the peer-to-peer network. For instance, when a first player tracking unit receives a request for a video program, the first player tracking unit may attempt to locate the requested program on a nearby player tracking unit. When a nearby player tracking unit has the requested program, the first player tracking unit may establish a peer-to-peer communication link the nearby player tracking unit and download the requested program from the nearby player tracking unit. The peer-to-peer transfer may provide a faster download then from a remote server and may lessen the bandwidth used on the local area network.

Figure 12:
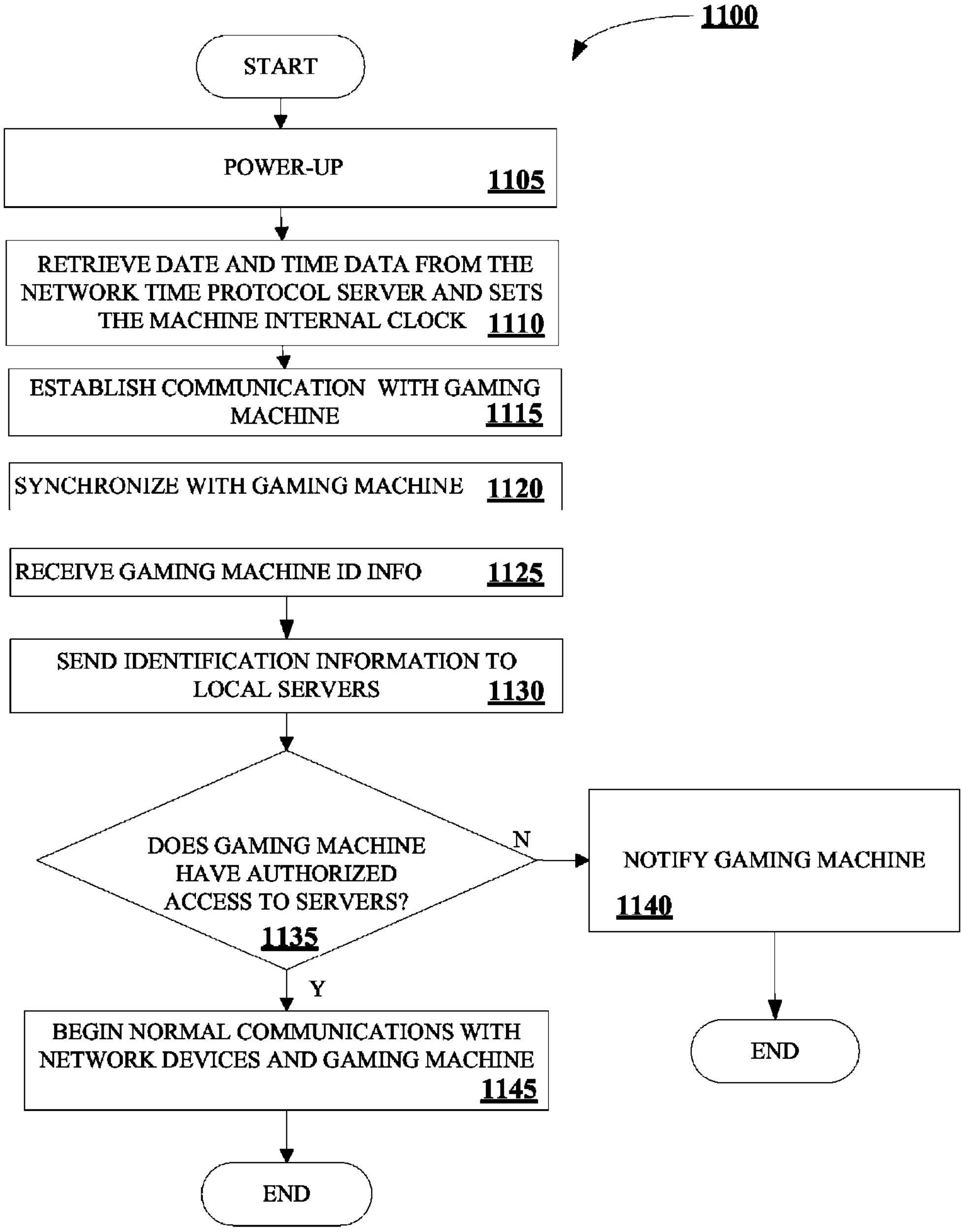
FIG. 12 is a flow chart of a method of registering a gaming machine with a player tracking unit of the present invention to one or more servers in communication with the player tracking unit.

FIG. 12 is a flow chart of a method 1100 of registering a gaming machine using a player tracking unit of the present invention to one or more servers in communication with the player tracking unit. The registration process may be referred as auto-provisioning. In the present invention, the player tracking unit and the host gaming machine may be registered as a single entity or the player tracking unit and the host gaming machine may be registered as separate entities. When the player tracking unit is registered separately from the gaming machine, additional information identifying the player tracking unit may be sent to the local servers in 1130.

In 1105, the player tracking unit is powered-up and may perform a variety of self checks. Typically, the player tracking unit receives power from its host gaming machine. However, the power supply may be independent (unswitched) of the gaming machine power supply and the player tracking unit may remain with power even when the gaming machine power is off. The player tracking unit and the gaming machine may be powered-up at the same time. The gaming machine and the player tracking unit may be powered-up together for a number of reasons, such as after it has been moved, after maintenance, after a power-failure or hardware failure and during initial installation.

In 1110, after the player tracking determines it is operating properly, it may establish a network connection, retrieve a date and a time data from a network time protocol server and set an internal clock on the player tracking unit (see description of FIG. 9) using the retrieved time and date. The date and the time provided by the network time protocol server may be used in the communication process between the player tracking unit and other network devices.

In 1115, the player tracking controller on the player tracking unit may establish communications with the master gaming controller on its host gaming machine. In 1120, again for communication purposes, the player tracking unit and the master gaming controller may synchronize clocks using the time and date retrieved from the network time protocol server. In 1125, the player tracking unit may receive gaming machine identification information from the host gaming machine. The information transfer may be initiated by the gaming machine or the player tracking unit.

In 1130, a registration message is sent to one or more local servers on the local area network that may communicate with the player tracking unit and/or the host gaming machine. The registration message may include but is not limited to 1) a request to register with the server for communication purposes. The registration message 1) a time and a date, 2) gaming machine identification information, 3) player tracking unit identification information and 4) a registration purpose (installation, power failure, machine movement, maintenance, etc). When the registration process has been initiated by an operator at the host gaming machine, the identification information may include operator identification information.

Depending on the registration purpose, different information may be sent to the host server. For instance, for a power-failure, the time and date of the power-failure may be sent to the host server. For security, this information may be compared with other records maintained by the server. As another example, a machine has been moved, its new location and old location may be sent to the server and compared with records of a movement schedule and previous records for the location of the gaming machine.

The communications between the player tracking unit and other devices on the network, such as during the registration process, may employ various security protocols and identification schemes including encryption to ensure secure and authenticated communications. Details of secure communication methods that may be employed with the present invention are described in co-pending U.S. application Ser. No. 09/732,650, filed Dec. 7, 2000 and titled, “Secure Virtual Networks in a Gaming Machine and co-pending U.S. application Ser. No. 10/116,424, filed Apr. 3, 2002, titled, “Secure Virtual Networks in a Gaming machine,” each of which is incorporated herein in their entirety and for all purposes.

In 1135, the player tracking unit may receive a reply from each of the one or more local servers and determine its login status for the host gaming machine and/or the player tracking unit. In 1140, when the gaming machine does not have authorization from a server, the player tracking may send a message to the gaming machine indicating that it does not have authorization and any possible reasons for the failure. The gaming machine may receive the information and attempt to perform self-diagnostics. When the registration process is being initiated by an operator, the gaming machine may display the reason for the failure to an operator. In response, the operator may attempt to remedy the problem and retry the registration process.

In 1145, when the gaming machine and/or the player tracking unit has been authorized for communications with a particular server, the player tracking unit and/or the gaming machine may begin normal communications with the server that has approved device. In one embodiment, a registration server may be used to authorize communications between a plurality of servers and the player tracking unit requesting an authorized communication connection. For instance, the registration server may authorize communications between the player tracking unit and its host gaming machine with a player tracking/accounting server, a cashless system server and a progressive. As noted above, the registration process may be carried out with each server individually. The authorization server may also be used to track communication requests between different devices, such as for peer-to-peer communications between different player tracking units and authorize peer-to-peer communications on the network.

In another embodiment, a single registration server, such as a floor control server, may be used as a player tracking unit registration site for all of the player tracking units in the player tracking system. Application servers, such as, a cashless system server, a gaming software server and a player tracking accounting server, may also register with the registration server. Thus, the registration server may act as a central registration agency and route messages to appropriate applications provided by the application servers. An advantage of this approach is that a new server providing a new application or an old server providing a new application may be added to the system without requiring all of the player tracking units to register with the server supplying the new application. Instead, the server with the new application may only have to register with the registration server and then the registration server will route messages for communications between the player tracking units and the newly registered application.

Figure 13:
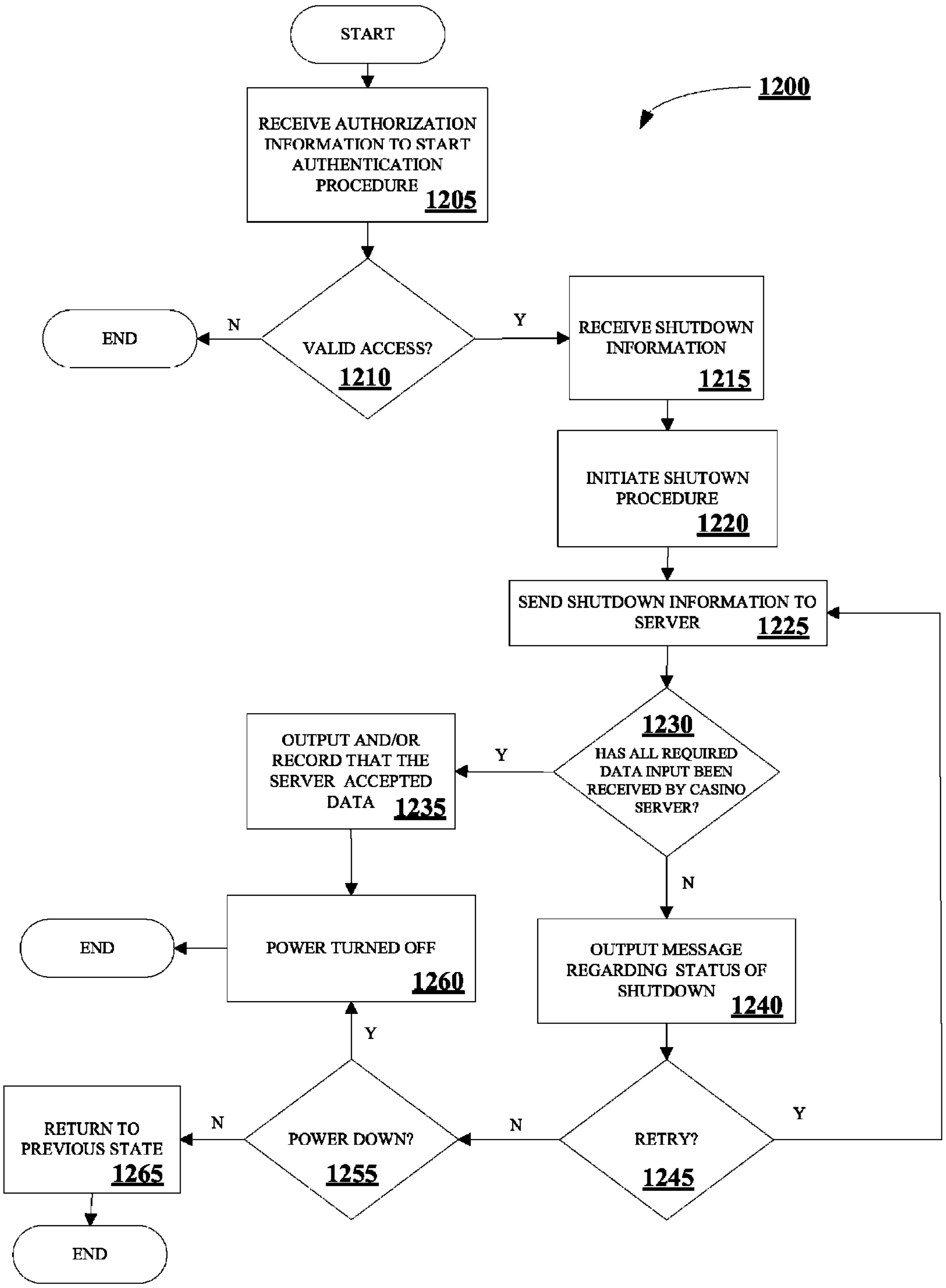
FIG. 13 is a flow chart of a method of deregistering a gaming machine with a player tracking unit of the present invention to one or more servers in communication with the player tracking unit.

FIG. 13 is a flow chart of a method 1200 of shutdown procedure (un-register) for a gaming machine with a player tracking unit of the present invention. In the shutdown procedure, the gaming machine and player tracking unit are disconnected from one or more servers in communication with the player tracking unit. In a gaming machine without a player tracking unit but with a network connection, this procedure may be implemented by the master gaming controller on the gaming machine. The shutdown procedure may be initiated for a number of reasons, such as but not limited to, prior to moving the gaming machine or bringing down the gaming machine power for maintenance.

In 1205, authorization information, such as identification information, is input into the gaming machine and received by the player tracking unit. The identification information may be for the person and/or the device requesting the shutdown. The authorization information may be input via an interface on the gaming machine or an interface on the player tracking unit. When the identification information is input via an interface on the gaming machine, the gaming machine may transmit the identification information to the player tracking unit. After receiving the identification information, the player tracking unit may send a message to a remote server with the identification message requesting authorization to begin a shutdown of the gaming machine. In 1210, the player tracking unit receives a reply message in regards to the shutdown request. The player tracking unit or master gaming controller may check the message to determine whether the requested shutdown has been approved.

In 1210, when the requested shutdown request has been disapproved (e.g., the operator incorrectly entered their identification information or the identification information is invalid), the shutdown procedure is not allowed to continue. When the shutdown request has been approved, in 1215, the reason for initiating the shutdown may be input. Next, in 1220, the shutdown procedure may be initiated.

In 1225, via the player tracking unit, a shutdown request message may be sent one or more servers via the local area network. The shutdown request message may include but is not limited to 1) gaming identification information, 2) date and time, 3) reason for the shutdown or disconnection from the network, 4) operator identification information and 5) state data for the gaming machine. The state data may include but is not limited to metering data and contents of the gaming machine's non-volatile memory. After receiving the shutdown request message and examining its contents, each of the one or more servers may send a reply message indicating that they have received a shutdown message and authorizing or not authorizing the shutdown request.

In 1230, the reply message is checked to determine whether the shutdown request has been authorized. When the shutdown request has been authorized, in 1235, the gaming machine operator may be notified via either the player tracking interface or the gaming machine interface, that shutdown request has been approved. Then, the operator, in 1260, may power-down the gaming machine and the player tracking unit. In other embodiments, the gaming machine and player tracking unit may be remotely powered down without intervention from the operator.

In 1240, when the shutdown request has not been approved, a status message indicating defects in the request may be displayed to an operator. In 1245, it is determined whether to retry to send the data and attempt to correct the defect. When a retry is attempted, the method returns to 1225. When a retry is not attempted, in 1255, a decision is made whether to power-down the gaming machine. When a power-down is not chosen, in 1265, the gaming machine may return to its previous state. When a power down is forced, in 1260, the power may be turned off. However, the player tracking unit, gaming machine and system server may log the abnormal shutdown by the operator that forced the shutdown.

In another embodiment, to automate the shutdown procedure/log-off procedure, a special single purpose card, such as smart card, magnetic striped card, or input device, such as a hand-held computer, that may interface with the player tracking unit may be programmed to implement the shutdown procedure. For instance, a smart card may be programmed with the shutdown command, authorization access data and the reason for the shutdown. Upon insertion of the smart card into a card reader on the player tracking unit, data may be uploaded and the logout may be commenced without further interrogation of the operator.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine may be provided without a top box or the gaming machine may be of a slant-top or table top design.

What is claimed is:

1. A player tracking system comprising: 1) one or more remote servers, 2) a plurality of gaming machines, each said gaming machine containing a player tracking unit mounted on each said gaming machine, and 3) a network designed or configured to allow communications between the plurality of gaming machines, the player tracking units and the one or more remote servers, wherein each of said player tracking units comprises:

a multimedia interface comprising:

a video display operable to display video content including still video images; one or more of the following player tracking interface devices:

a card reader, a key pad, a bonus button, a function button, a microphone, sound projection devices, a camera, a wireless interface device, a proximity sensor, selection buttons, an enter button, a bar-code reader, an RFID reader and a finger print reader;

a player tracking controller designed or configured to: 1) communicate with the multimedia interface, the one or more player tracking interface devices, a master gaming controller that controls a game played on the gaming machine to which said player tracking unit is mounted and the one or more remote servers; 2) output a program comprising video content to the multimedia interface; 3) in response to a request initiated at the player tracking unit to the one or more remote servers, the gaming machine to which said player tracking unit is mounted, or the player tracking unit, receive a download of digitally formatted video content; 4) determine whether one or more conditions for when to display the digitally formatted video content is met; 5) in response to at least a first condition of the one or more conditions being met, display the digitally formatted video content; 6) collect gaming data from the gaming machine and 7) send the gaming data to one of the one or more remote servers;

a multimedia board for processing digitally formatted program files including the digitally formatted video content for output on the multimedia interface; and a memory device for storing the downloaded digitally formatted video content coupled to the multimedia board.

2. A player tracking system comprising: 1) one or more remote servers, 2) a plurality of gaming machines, each said gaming machine containing a player tracking unit mounted on said gaming machine, and 3) a network designed or configured to allow communications between the plurality of gaming machines, the player tracking units and the one or more remote servers, wherein each of said player tracking units comprises:

a multimedia interface comprising:

a video display operable to display video content including still video images;

one or more of the following player tracking interface devices: a card reader, a key pad, a bonus button, a function button, a microphone, sound projection devices, a camera, a wireless interface device, a proximity sensor, selection buttons, an enter button, a bar-code reader, an RFID reader and a finger print reader;

a player tracking controller designed or configured to: 1) communicate with the multimedia interface, the one or more player tracking interface devices, a master gaming controller that controls a game played on the gaming machine to which said player tracking unit is mounted and one or more remote servers; 2) output a program comprising video content to the multimedia interface; 3) in response to a request initiated at a first remote server to the player tracking unit, receive a download of digitally formatted video content; 4) in response to the request initiated at the first remote server, receive one or more conditions for when to display the digitally formatted video content; 5) in response to a first condition of the one or more conditions being met, display the digitally formatted video content; 6) collect gaming data from the gaming machine to which said player tracking unit is mounted; and 7) send the gaming data to one of the one or more remote servers;

a multimedia board for processing digitally formatted program files including the digitally formatted video content for output on the multimedia interface; and a memory for storing the downloaded digitally formatted video content coupled to the multimedia board.

3. A gaming machine comprising:

a master gaming controller designed or configured to control one or more games of chance played on the gaming machine; and a player tracking unit mounted on said gaming machine comprising:

a multimedia interface comprising:

a video display operable to display video content including still video images;

one or more of the following player tracking interface devices: a card reader, a key pad, a bonus button, a function button, a microphone, sound projection devices, a camera, a wireless interface device, a proximity sensor, selection buttons, an enter button, a barcode reader, an RFID reader and a finger print reader;

a player tracking controller designed or configured to: 1) communicate with the multimedia interface, the one or more player tracking interface devices, the master gaming controller and one or more remote servers; 2) output a program comprising video content and combinations thereof, to the multimedia interface; 3) in response to a request initiated at a first remote server to the player tracking unit, receive a download of digitally formatted video content; 4) in response to the request initiated at the first remote server, receive one or more conditions for when to display the digitally formatted video content; 5) in response to a first condition of the one or more conditions being met, display the digitally formatted video content; 6) collect gaming data from the gaming machine; and 7) send the gaming data to one of the remote servers;

a multimedia board for processing digitally formatted program files including the digitally formatted video content for output on the multimedia interface; and a memory for storing the downloaded digitally formatted video content coupled to the multimedia board.

4. A gaming machine comprising:

a master gaming controller designed or configured to control one or more games of chance played on the gaming machine; and a player tracking unit mounted on said gaming machine comprising:

a multimedia interface comprising:

a video display;

one or more of the following player tracking interface devices: a card reader, a key pad, a bonus button, a function button, a microphone, sound projection devices, a camera, a wireless interface device, a proximity sensor, selection buttons, an enter button, a bar-code reader, an RFID reader and a finger print reader;

a player tracking controller designed or configured to:

1) communicate with the multimedia interface, the one or more player tracking interface devices, the master gaming controller and one or more remote servers; 2) output a program comprising video content to the multimedia interface; 3) in response to a request initiated at the player tracking unit to one or more of the one or more remote servers, receive a download of digitally formatted video content; 4) determine whether one or more conditions for when to display the digitally formatted video content is met; 5) in response to at least a first condition of the one or more conditions being met, display the digitally formatted video content; 6) collect gaming data from the gaming machine; and 7) send the gaming data to one of the one or more remote servers;

a multimedia board for processing digitally formatted program files including the digitally formatted video content for output on the multimedia interface; and a memory device for storing the downloaded digitally formatted video content coupled to the multimedia board.

5. A gaming machine comprising:

a master gaming controller designed or configured to control a game of chance played on the gaming machine;

a main display operable to display a presentation of the game of chance;

a touch screen coupled to the main display; and a gaming device coupled to and mounted on the gaming machine comprising:

1) a multimedia board for processing digitally formatted program files including digitally formatted video content for output on the main display;

2) a memory device for storing the digitally formatted video content coupled to the multimedia board, wherein the digitally formatted video content includes still images; and 3) a controller designed or configured to: a) communicate with the master gaming controller and one or more remote servers; b) output a program comprising the digitally formatted video content to the main display; c) in response to a request initiated at the gaming machine to one or more of the one or more remote servers, receive a download of the digitally formatted video content; d) determine whether one or more conditions for when to display the digitally formatted video content is met; e) in response to at least a first condition of the one or more conditions being met, display the digitally formatted video content; f) collect gaming data from the gaming machine and g) send the gaming data to one of the one or more remote servers.

6. The gaming machine of claim 5, wherein the controller is further designed or configured to display a menu of programs on the main display that are available for output on the main display.

7. The gaming machine of claim 5, wherein the program is selected from a video-on-demand menu which provides a plurality of video program selections.

8. The gaming machine of claim 5, wherein the controller is further designed or configured to provide a feature that augments the game of chance generated by the master gaming controller.

9. The gaming machine of claim 5, wherein the program includes advertising.

10. The gaming machine of claim 5, wherein the gaming data includes credit information.

11. The gaming machine of claim 5, wherein the controller is further designed or configured to provide access to a sports book for wagering on a sporting event.

12. The gaming machine of claim 5, wherein the controller is further designed or configured to provide access to a game separate from the game chance controlled by the master gaming controller.

13. A gaming machine comprising:

a master gaming controller designed or configured to control a game of chance played on the gaming machine;

a main display operable to display a presentation of the game of chance;

a touch screen coupled to the main display; and a gaming device coupled to and mounted on the gaming machine comprising:

1) a multimedia board for processing digitally formatted program files including digitally formatted video content for output on the main display; and 2) a memory device for storing the digitally formatted video content coupled to the multimedia board, wherein the digitally formatted video content includes still images; and 3) a controller designed or configured to: a) communicate with the master gaming controller and one or more remote servers; b) output a program comprising the digitally formatted video content to the main display; c) in response to a request initiated at a first remote server to the gaming machine, receive a download of the digitally formatted video content; d) determine whether one or more conditions for when to display the digitally formatted video content is met; e) in response to at least a first condition of the one or more conditions being met, display the digitally formatted video content; f) collect gaming data from the gaming machine; and g) send the gaming data to one of the one or more remote servers.

14. The gaming machine of claim 13, wherein the controller is further designed or configured to display a menu of programs on the main display that are available for output on the main display.

15. The gaming machine of claim 13, wherein the program is selected from a video-on-demand menu which provides a plurality of video program selections.

16. The gaming machine of claim 13, wherein the controller is further designed or configured to provide a feature that augments the game of chance generated by the master gaming controller.

17. The gaming machine of claim 13, wherein the program includes advertising.

18. The gaming machine of claim 13, wherein the gaming data includes credit information.

19. The gaming machine of claim 13, wherein the controller is further designed or configured to provide access to a sports book for wagering on a sporting event.

20. The gaming machine of claim 13, wherein the controller is further designed or configured to provide access to a game separate from the game chance controlled by the master gaming controller.

* * * * *